US010175885B2

(12) United States Patent
Kanno et al.

(10) Patent No.: US 10,175,885 B2
(45) Date of Patent: Jan. 8, 2019

(54) MEMORY DEVICE MANAGING DATA IN ACCORDANCE WITH COMMAND AND NON-TRANSITORY COMPUTER READABLE RECORDING MEDIUM

(71) Applicant: TOSHIBA MEMORY CORPORATION, Minato-ku (JP)

(72) Inventors: Shinichi Kanno, Tokyo (JP); Hiroshi Nishimura, Hachioji (JP); Hideki Yoshida, Tachikawa (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 33 days.

(21) Appl. No.: 15/000,627

(22) Filed: Jan. 19, 2016

(65) Prior Publication Data

US 2016/0210052 A1 Jul. 21, 2016

(30) Foreign Application Priority Data

Jan. 19, 2015 (JP) .................................. 2015-007963
May 29, 2015 (JP) .................................. 2015-110444
Jan. 15, 2016 (JP) .................................. 2016-006026

(51) Int. Cl.
  *G06F 12/00* (2006.01)
  *G06F 13/00* (2006.01)
  (Continued)

(52) U.S. Cl.
  CPC .......... *G06F 3/0604* (2013.01); *G06F 3/0611* (2013.01); *G06F 3/0644* (2013.01); *G06F 3/0688* (2013.01)

(58) Field of Classification Search
  CPC .... G06F 3/0604; G06F 3/0611; G06F 3/0644; G06F 3/0688
  (Continued)

(56) References Cited

U.S. PATENT DOCUMENTS 5,031,089 A * 7/1991 Liu ........................ G06F 9/5088
  709/201
5,465,335 A 11/1995 Anderson
  (Continued)

FOREIGN PATENT DOCUMENTS

JP 3604091 12/2004
JP 4797636 10/2011
  (Continued)

*Primary Examiner* — Sheng Jen Tsai
(74) *Attorney, Agent, or Firm* — Oblon, McClelland, Maier & Neustadt, L.L.P.

(57) ABSTRACT

According to one embodiment, a memory device includes a first memory, a control circuit controlling the first memory, and a second memory storing a second program. The second program manages management information associated with the first memory, sends the management information conforming to a specific interface to a first program if a command conforming to the specific interface is an output command to output the management information. The second program receives first information conforming to the specific interface and issued by the first program, translates the first information into second information corresponding to the second program, translates the second information into third information corresponding to the control circuit, and executes processing for the first memory in accordance with the third information.

14 Claims, 26 Drawing Sheets

(51) Int. Cl.
    *G06F 13/28* (2006.01)
    *G06F 3/06* (2006.01)

(58) Field of Classification Search
    USPC .......................................................... 711/103
    See application file for complete search history.

(56) References Cited

U.S. PATENT DOCUMENTS

| | | | |
|---|---|---|---|
| 7,150,021 B1* | 12/2006 | Vajjhala | G06F 13/364 718/103 |
| 7,903,677 B2* | 3/2011 | Yasuda | H04L 49/35 370/404 |
| 8,413,161 B2 | 4/2013 | Blackburn et al. | |
| 8,583,783 B1* | 11/2013 | Hayward | G06F 12/0253 707/813 |
| 8,869,156 B2 | 10/2014 | Aulakh et al. | |
| 2006/0080457 A1* | 4/2006 | Hiramatsu | G06F 15/17 709/232 |
| 2006/0136878 A1* | 6/2006 | Raghunath | G06F 8/456 717/130 |
| 2006/0190942 A1* | 8/2006 | Inoue | G06F 9/4856 718/100 |
| 2009/0043959 A1* | 2/2009 | Yamamoto | G06F 3/0608 711/112 |
| 2009/0241124 A1* | 9/2009 | Denneau | G06F 11/008 718/105 |
| 2010/0169556 A1* | 7/2010 | Nakanishi | G06F 3/0643 711/103 |
| 2010/0325345 A1* | 12/2010 | Ohno | G06F 3/0652 711/103 |
| 2011/0060863 A1* | 3/2011 | Kimura | G06F 3/0611 711/103 |
| 2011/0161551 A1 | 6/2011 | Khosravi et al. | |
| 2011/0246758 A1* | 10/2011 | Lu | G06F 9/442 713/2 |
| 2012/0159051 A1* | 6/2012 | Hida | G06F 3/0611 711/103 |
| 2013/0297880 A1* | 11/2013 | Flynn | G06F 1/183 711/128 |
| 2014/0376406 A1 | 12/2014 | Kim et al. | |
| 2015/0121033 A1* | 4/2015 | Higeta | G06F 3/0611 711/207 |
| 2015/0169443 A1* | 6/2015 | Lee | G06F 12/0253 711/103 |
| 2015/0309841 A1* | 10/2015 | Ono | G06F 9/5027 718/1 |
| 2016/0103478 A1* | 4/2016 | Nakanishi | G06F 1/3206 713/323 |

FOREIGN PATENT DOCUMENTS

| | | |
|---|---|---|
| JP | 2012-141944 | 7/2012 |
| JP | 5425739 | 2/2014 |

\* cited by examiner

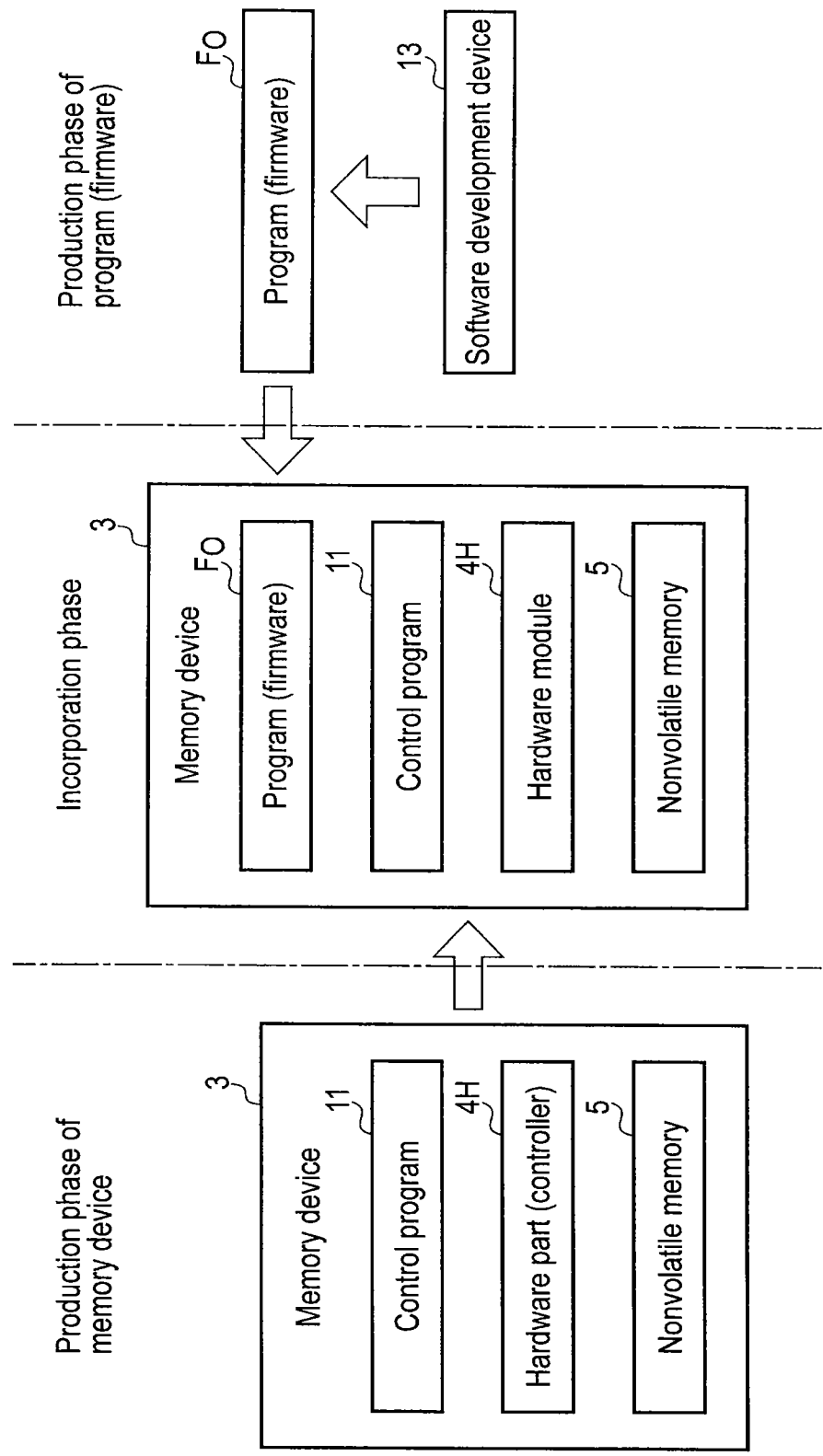
F I G. 3

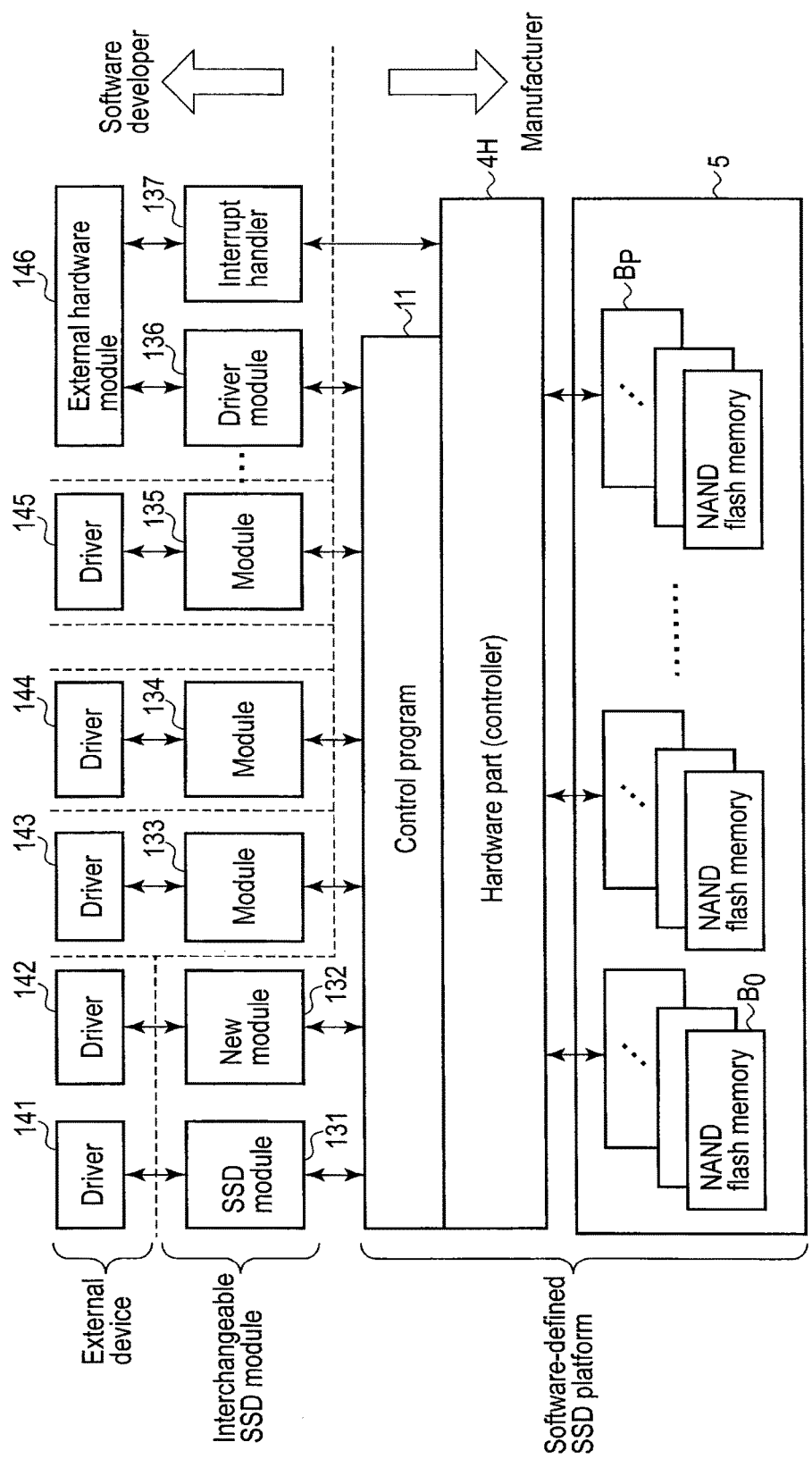
F I G. 4

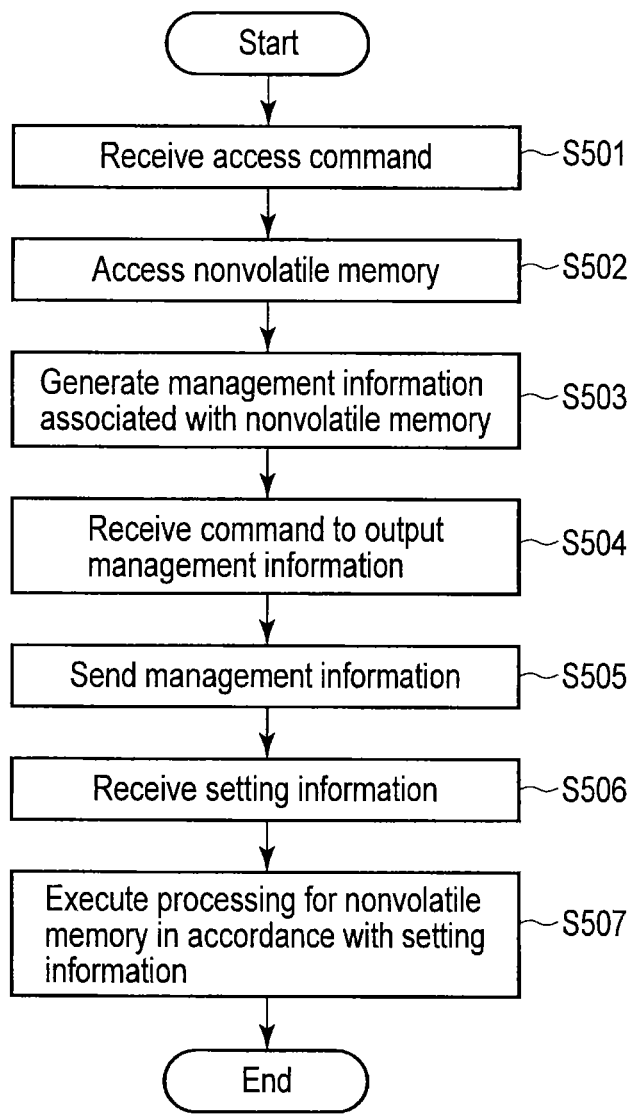
F I G. 5

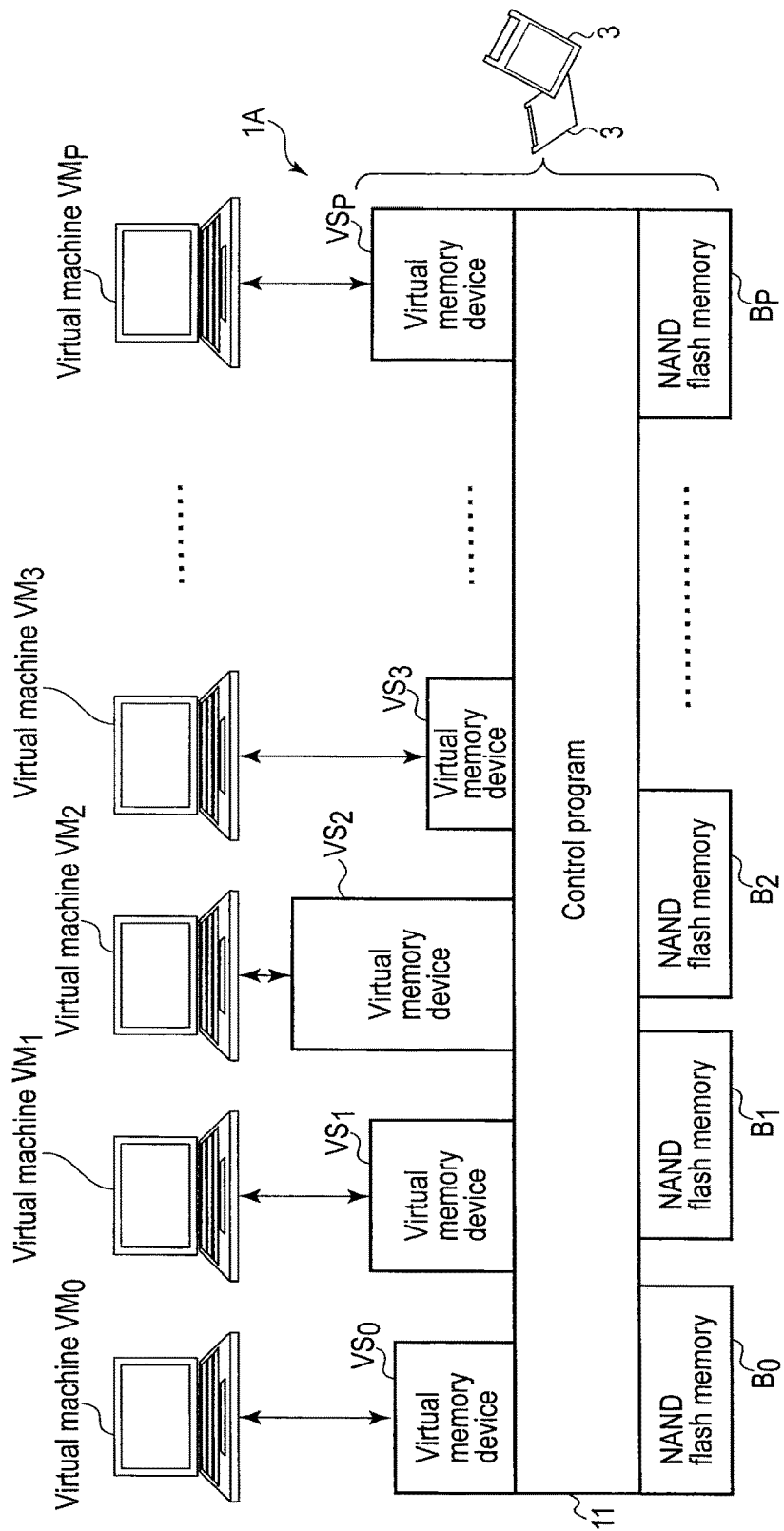
F I G. 6

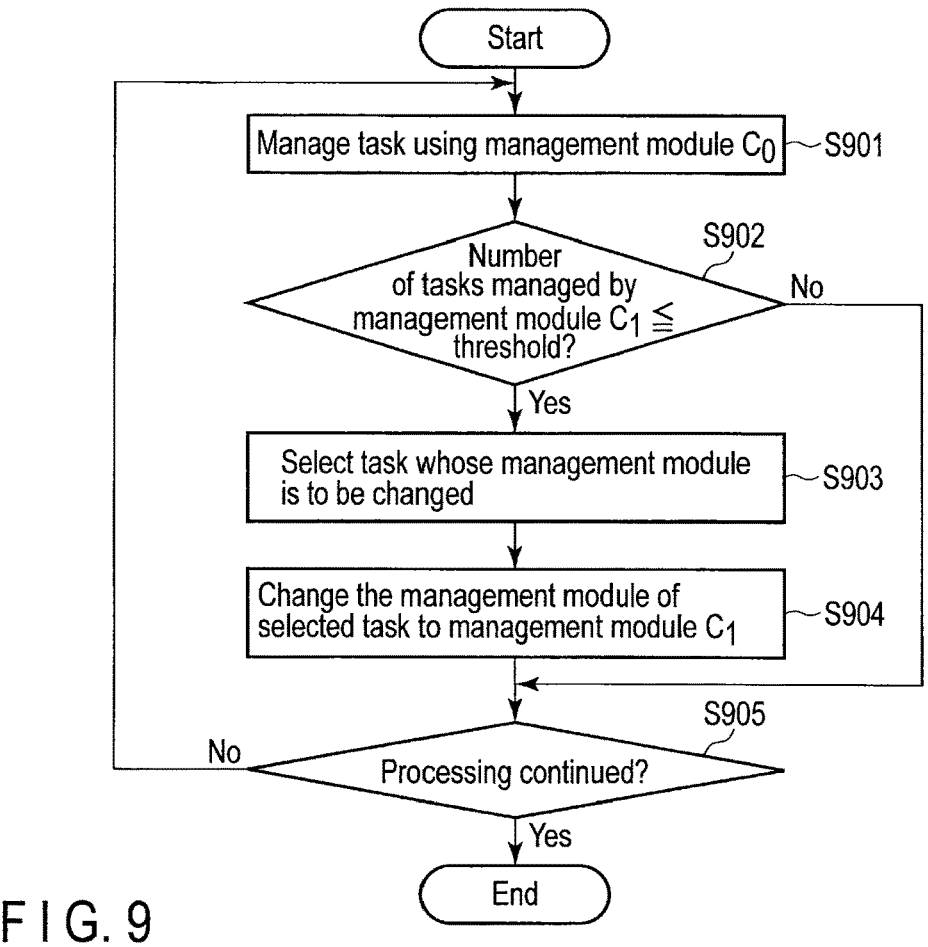
F I G. 9
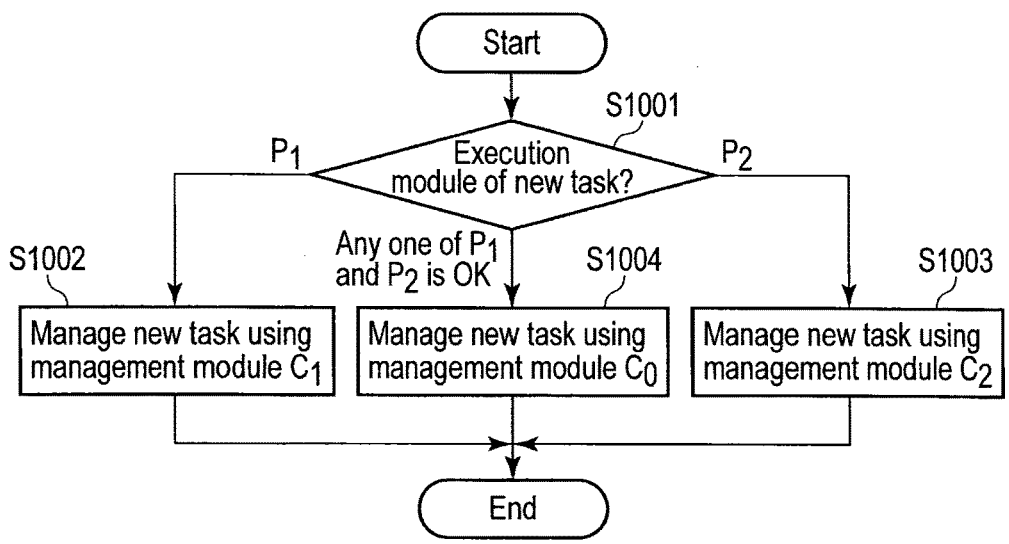
F I G. 10

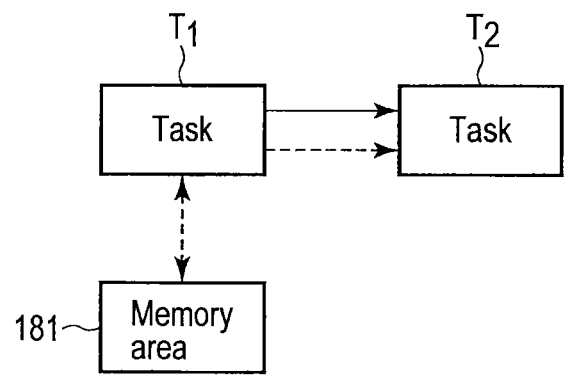
F I G. 11
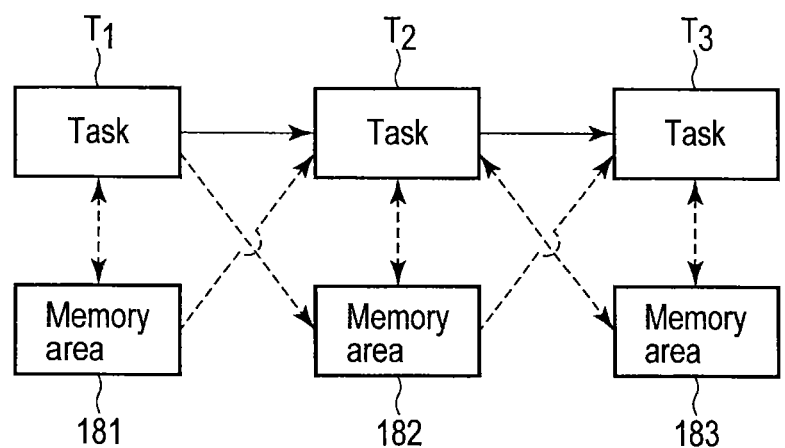
F I G. 12

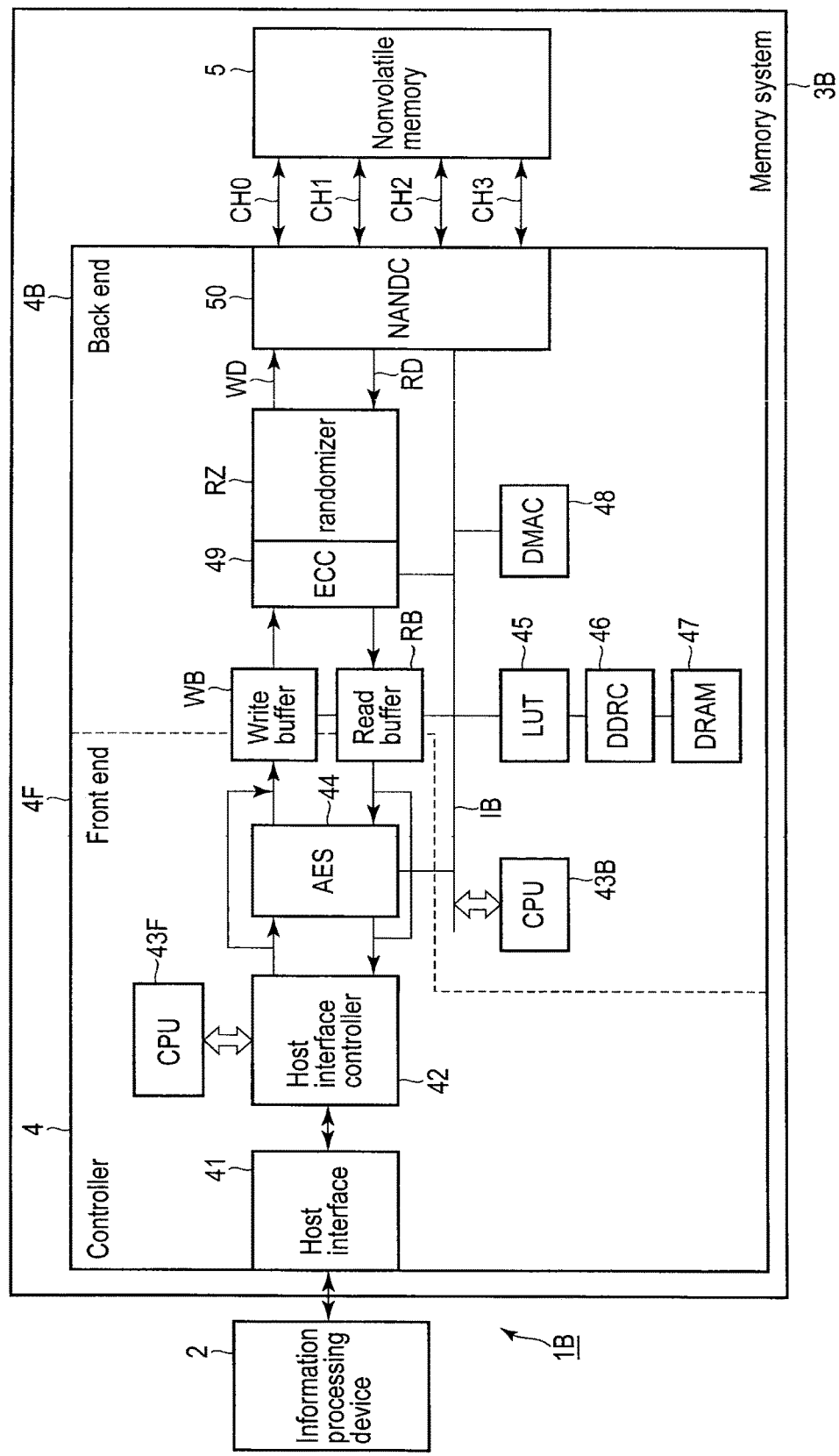
F I G. 13

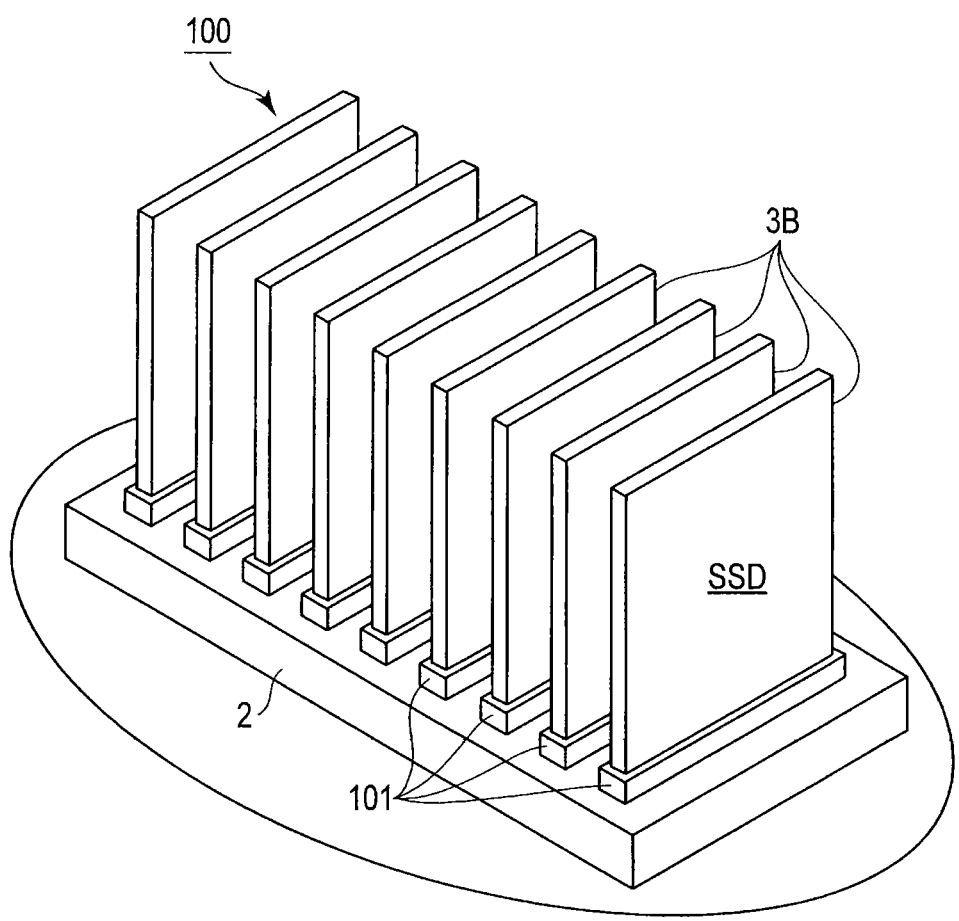
F I G. 14

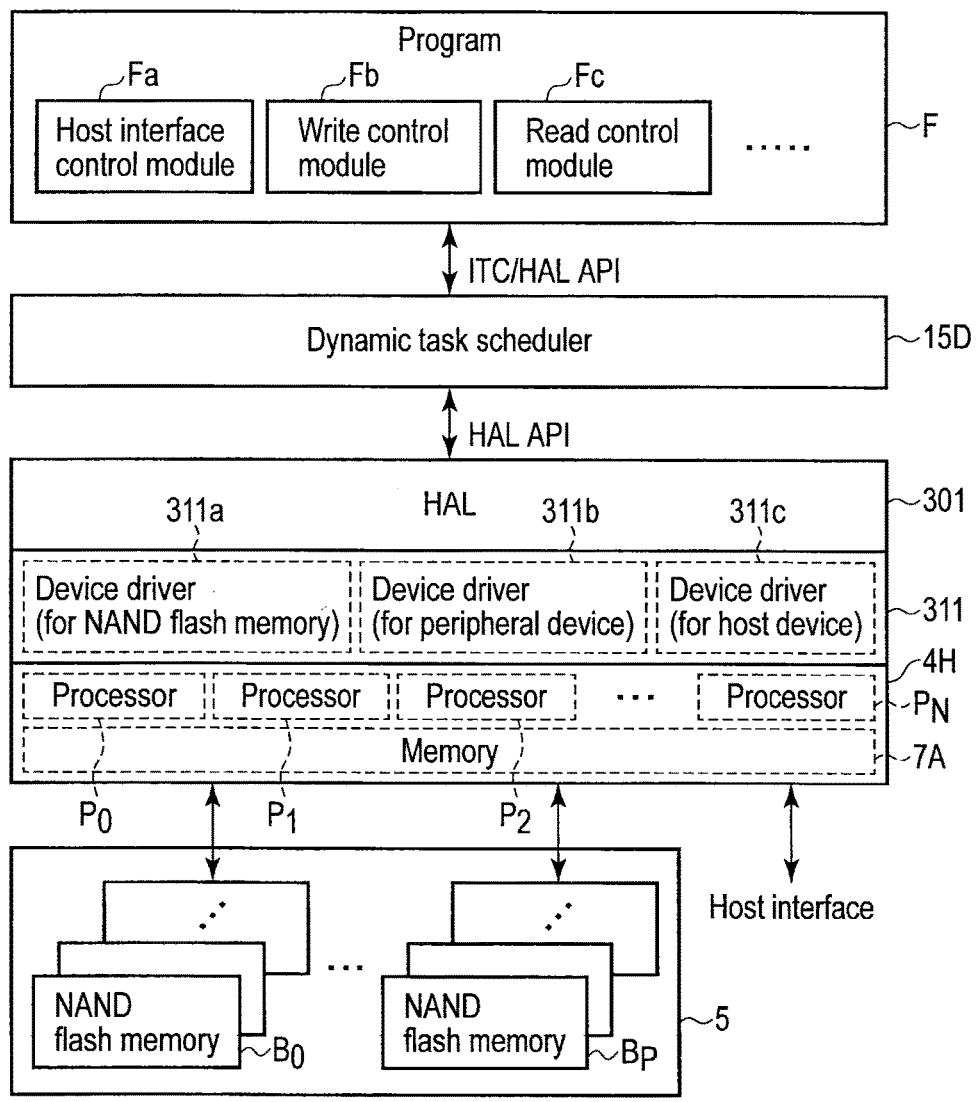
F I G. 15

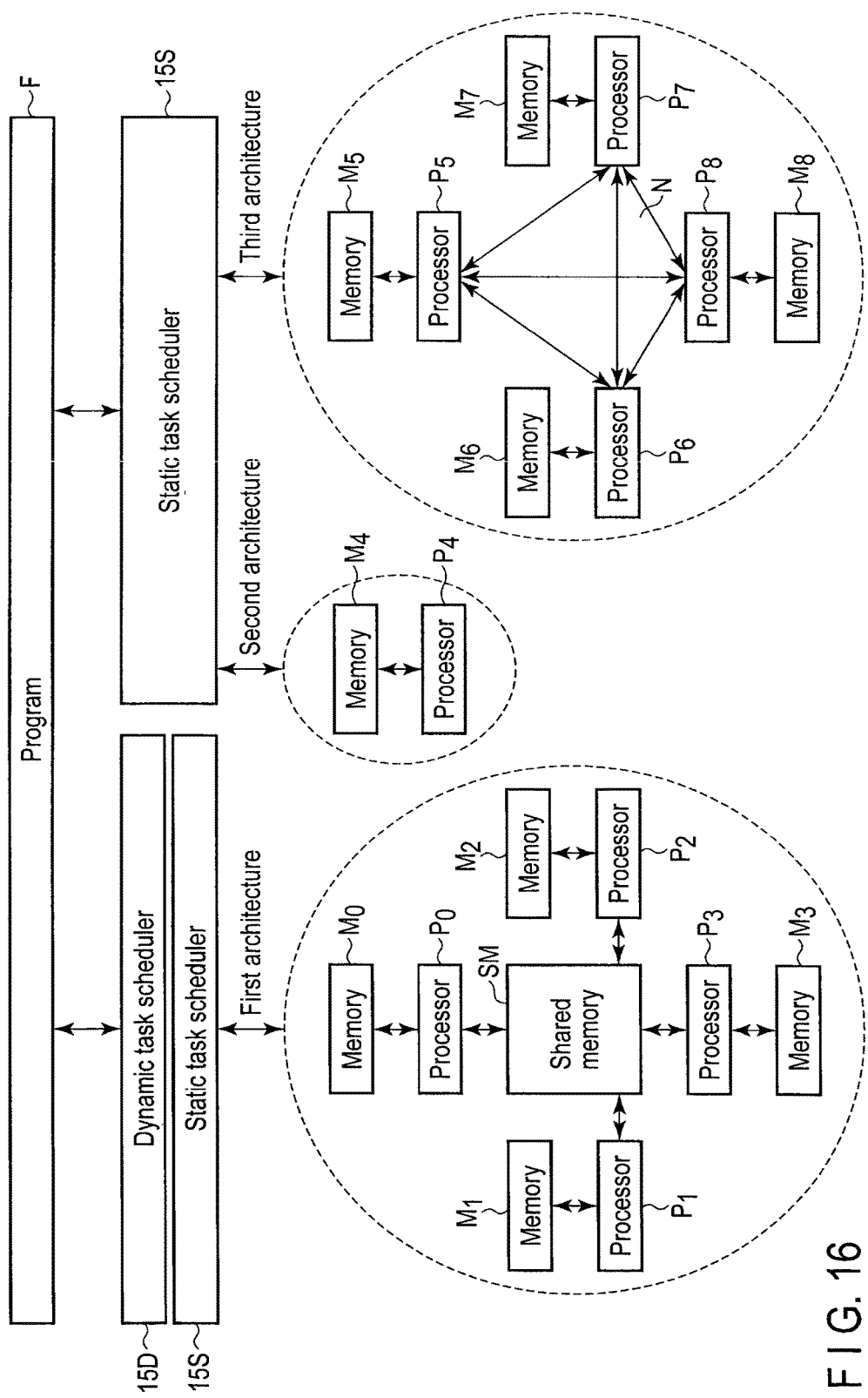
F I G. 16

Program

| Access latency (2 bits) |
|---|
| 00 : Latency is unallowable |
| 01 : Short latency is allowable |
| 10 : General latency is allowable |
| 11 : Long latency is allowable |

~P1701

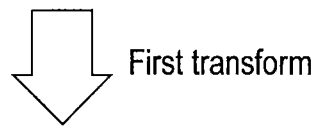 First transform

HAL (NAND controller device driver)

| Access latency (8 bits) |
|---|
| 0 ~ 255 |

~P1702

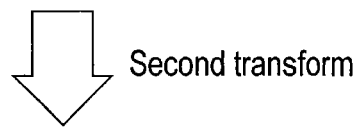 Second transform

Hardware part (NAND flash memory)

Access latency Parameter set

| Parameter set number | 0 | 1 | 2 | ... |
|---|---|---|---|---|
| DLA scheme (On/Off) | Off | Off | On | ... |
| Iterated-decoding count (1-5) | 1 | 5 | 5 | ... |
| Latency threshold (1-5) | 1 | 1 | 5 | ... |

~P1703

F I G. 17

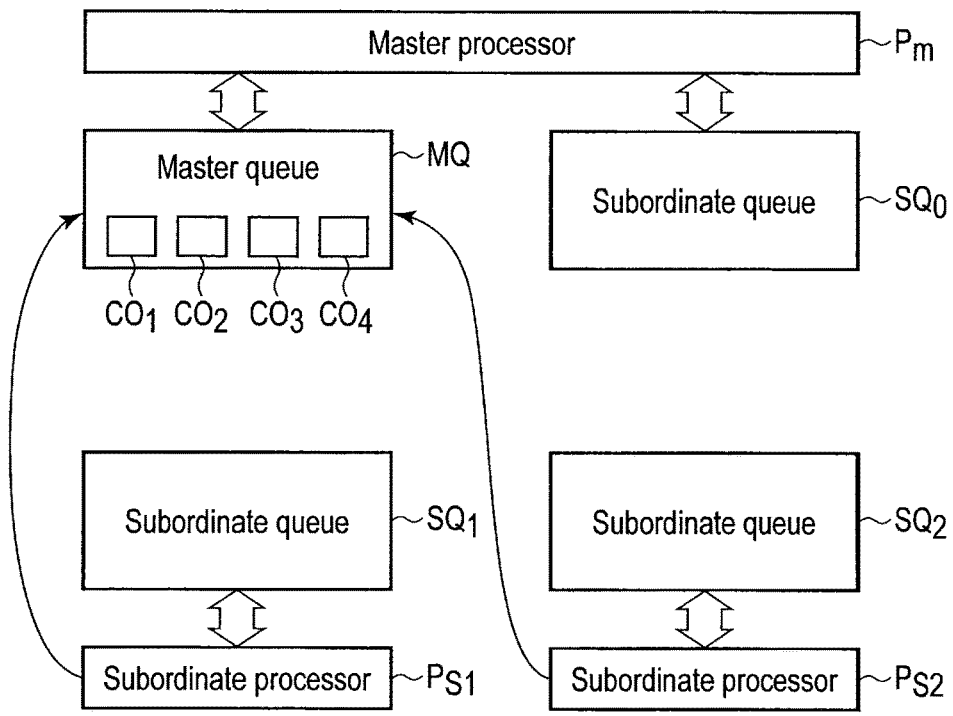
F I G. 19
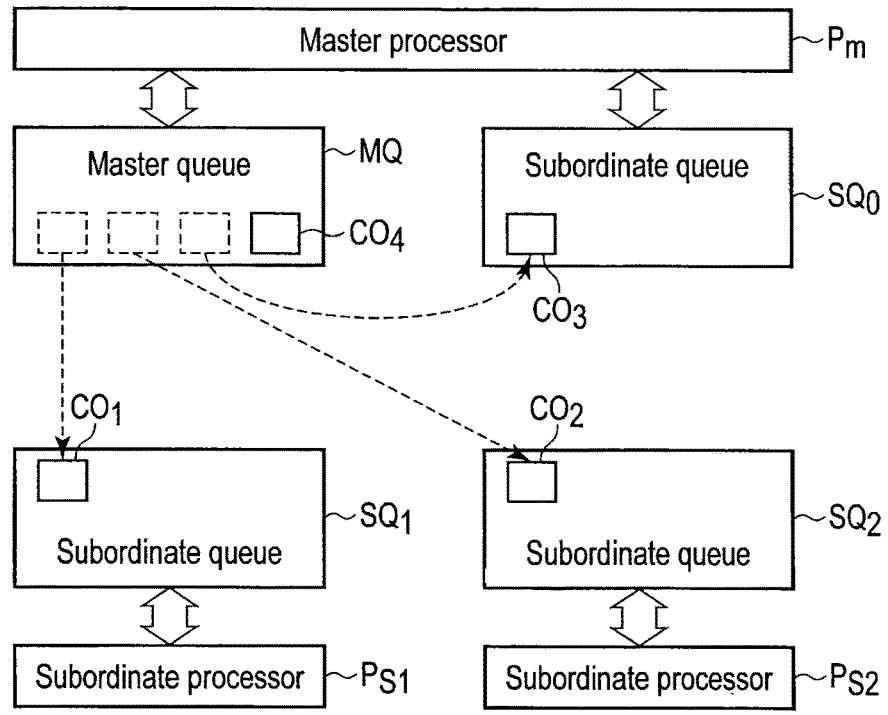
F I G. 20

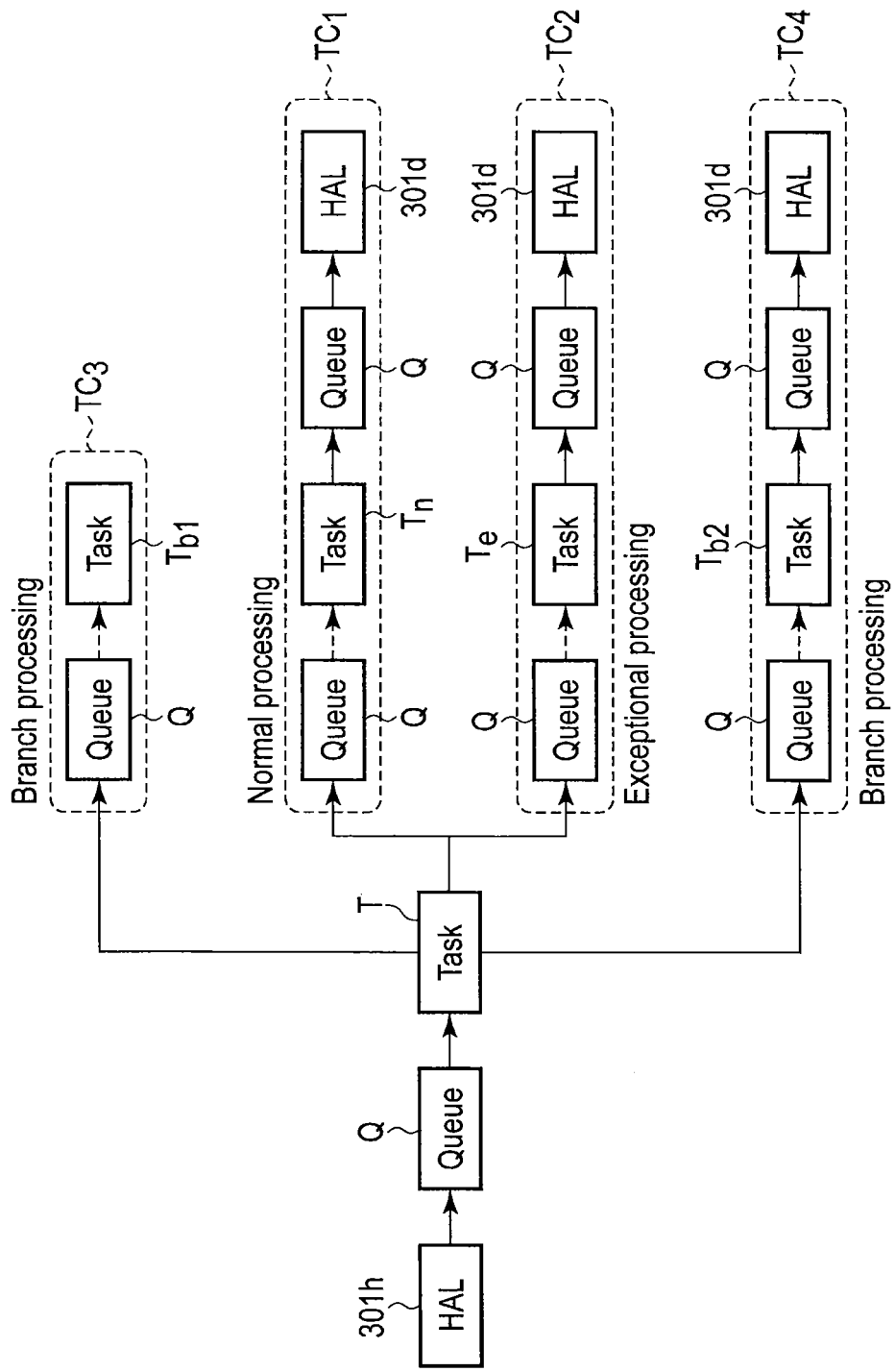
F I G. 22

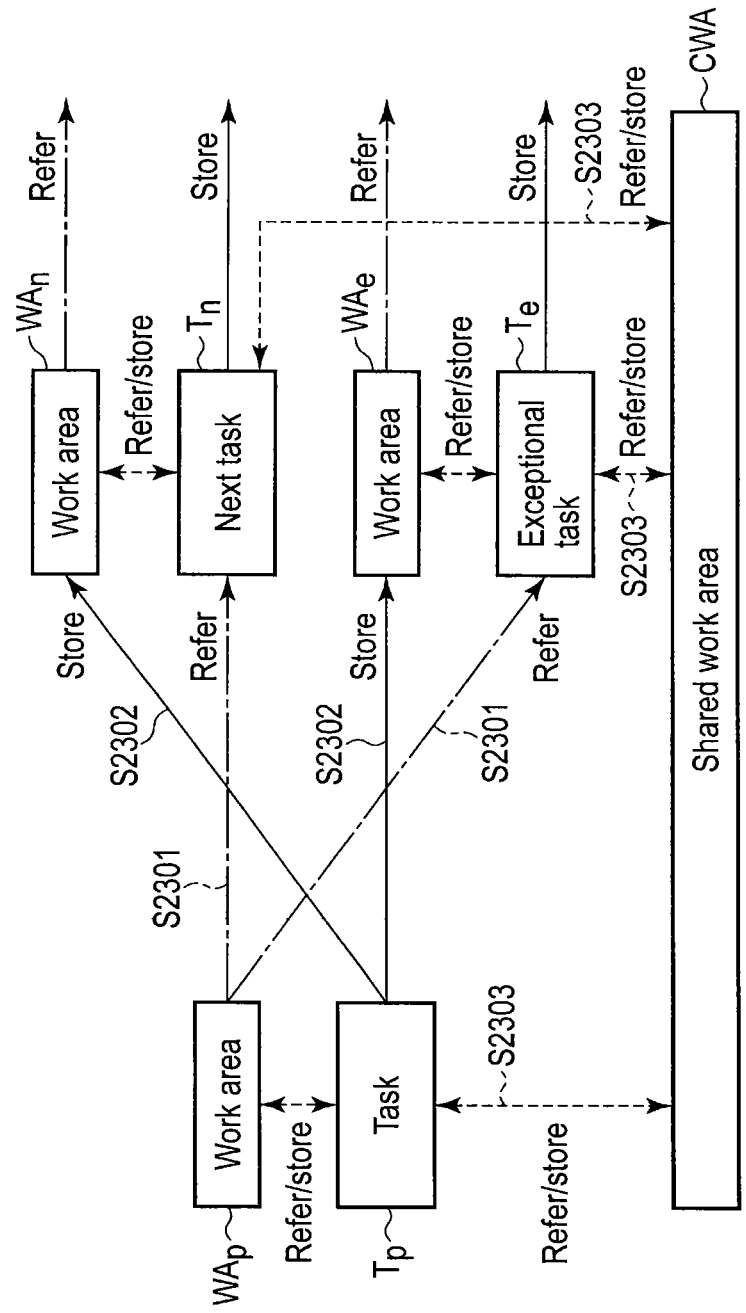
F I G. 23

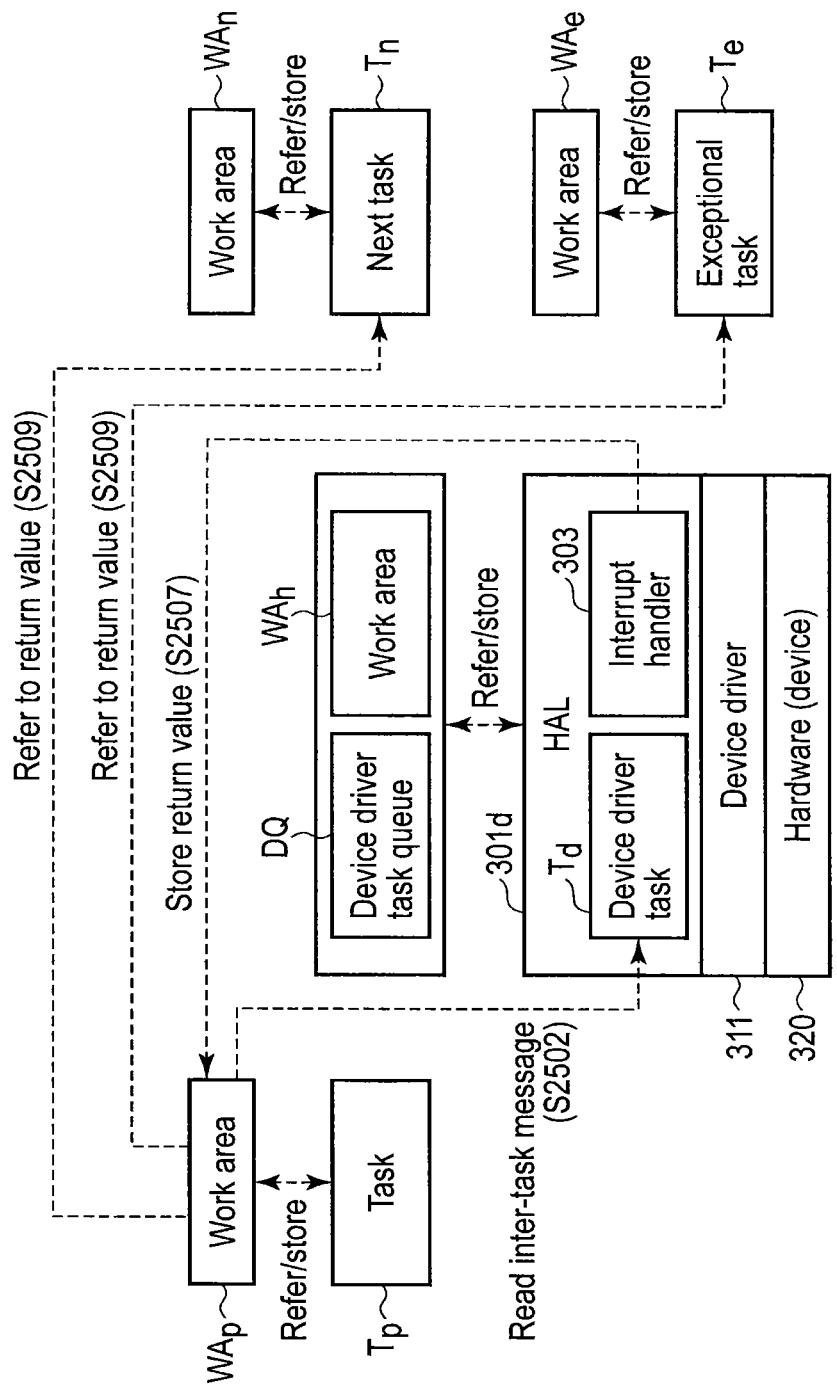
F I G. 26

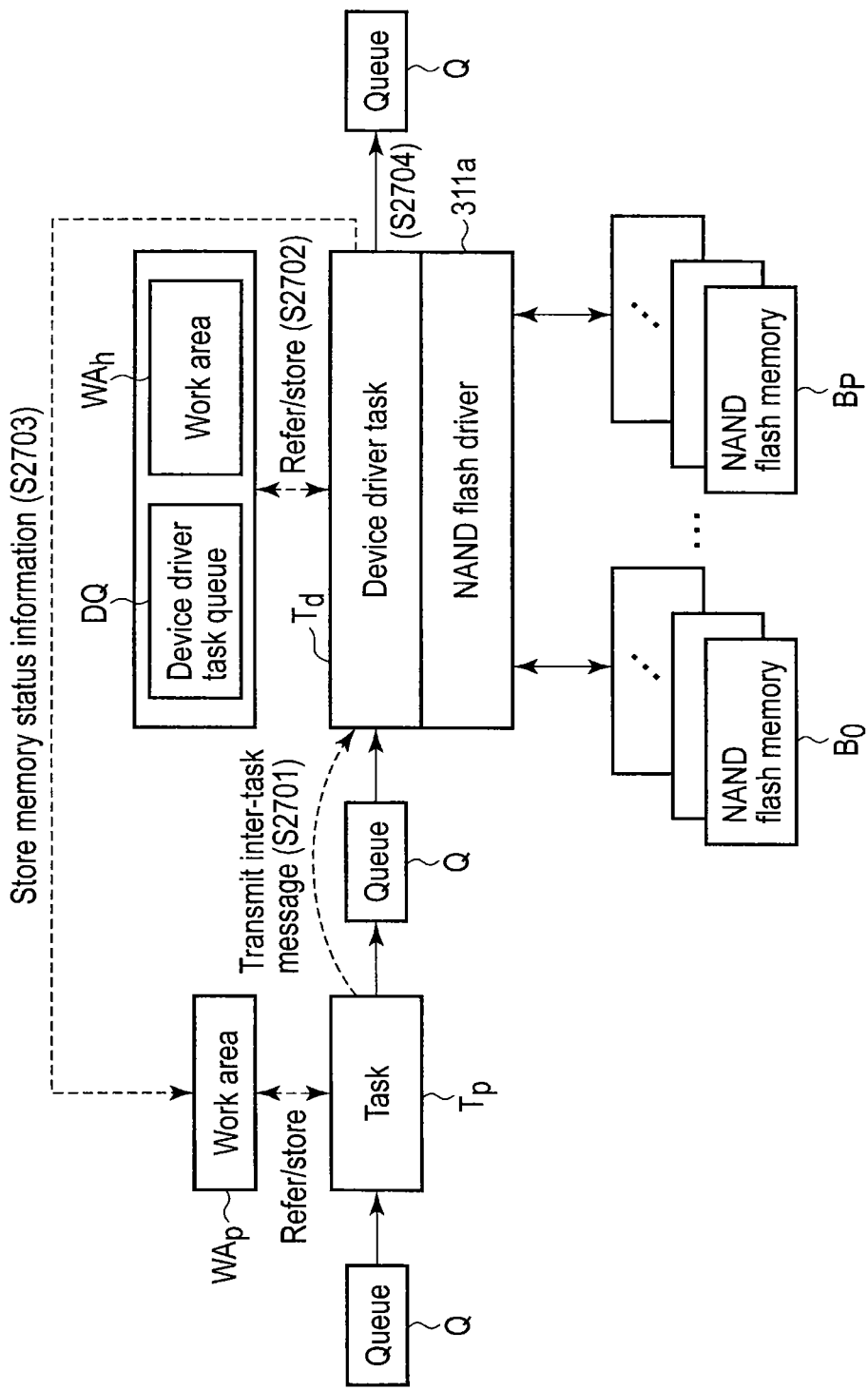
F I G. 28

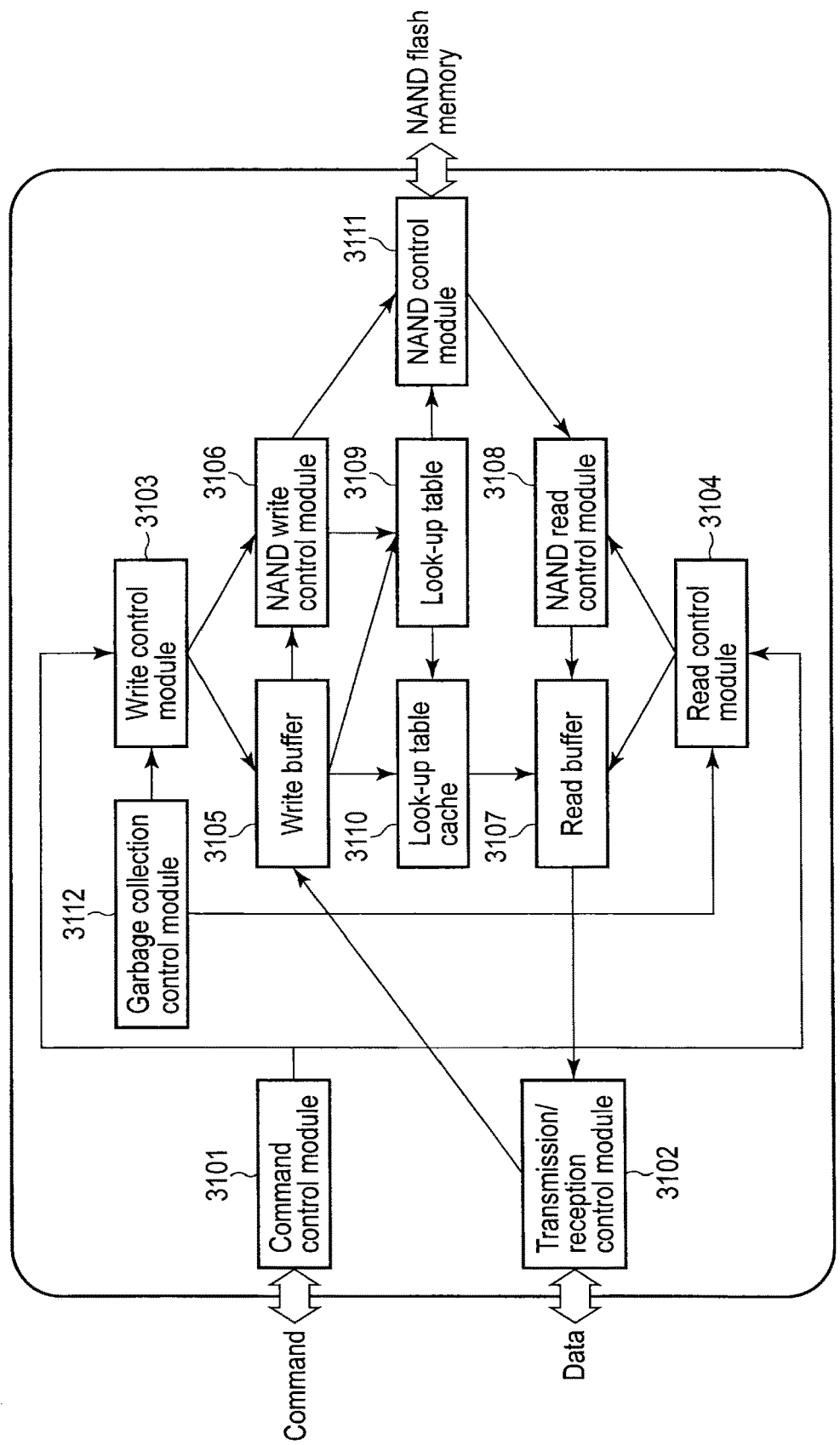
F I G. 30

MEMORY DEVICE MANAGING DATA IN ACCORDANCE WITH COMMAND AND NON-TRANSITORY COMPUTER READABLE RECORDING MEDIUM

CROSS-REFERENCE TO RELATED APPLICATIONS

This application is based upon and claims the benefit of priority from Japanese Patent Applications No. 2015-007963, filed Jan. 19, 2015; No. 2015-110444, filed May 29, 2015; and No. 2016-006026, filed Jan. 15, 2016, the entire contents of all of which are incorporated herein by reference.

FIELD

Embodiments described herein relate generally to a memory device managing data in accordance with a command and non-transitory computer readable recording medium.

BACKGROUND

A solid-state drive (SSD) includes, for example, a nonvolatile memory, such as a NAND flash memory. The NAND flash memory includes a plurality of blocks (physical blocks). A plurality of blocks include a plurality of memory cells arranged at the intersections of word lines and bit lines.

BRIEF DESCRIPTION OF THE DRAWINGS

FIG. 3 is a block diagram showing an example of an installation state in a memory device according to the first embodiment.

FIG. 4 is a block diagram showing an example of a relationship between structural elements of the information processing system according to the first embodiment.

FIG. 5 is a flowchart showing an example of processing performed by the control program and a hardware module according to the first embodiment.

FIG. 6 is a block diagram showing an example of a relationship between structural elements of an information processing system according to the second embodiment.

FIG. 9 is a flowchart showing an example of the first processing executed by a scheduler according to the third embodiment.

FIG. 10 is a flowchart showing an example of second processing executed by the scheduler according to the third embodiment.

FIG. 11 is a block diagram showing an example of a notification state of area information between tasks according to the third embodiment.

FIG. 12 is a block diagram showing an example of a relationship between the tasks and memory areas according to the third embodiment.

FIG. 13 is a block diagram showing of an example of a detail structure of an information processing system according to the fourth embodiment.

FIG. 14 is a perspective view showing an example of a storage system according to the fourth embodiment.

FIG. 15 is a block diagram showing an example of a configuration of a software-defined platform according to the fifth embodiment.

FIG. 16 is a view showing examples of two types of scheduling realized by the software-defined SSD platform according to the fifth embodiment.

FIG. 17 is a view showing examples of parameters held in each layer of the memory device according to the fifth embodiment.

FIG. 19 is a view showing the first example of the scheduling according to the fifth embodiment.

FIG. 20 is a view showing the second example of the scheduling according to the fifth embodiment.

FIG. 22 is a view showing an example of a task chain according to the fifth embodiment.

FIG. 23 is a view showing an example of receiving/providing of information between tasks according to the fifth embodiment.

FIG. 26 is a block diagram showing an example of the communication using the HAL according to the fifth embodiment.

FIG. 28 is a block diagram showing an example of the HAL API for the NAND flash driver according to the fifth embodiment.

FIG. 30 is a block diagram showing an example of a function of the software-defined SSD platform according to the fifth embodiment.

DETAILED DESCRIPTION

Figure 1:
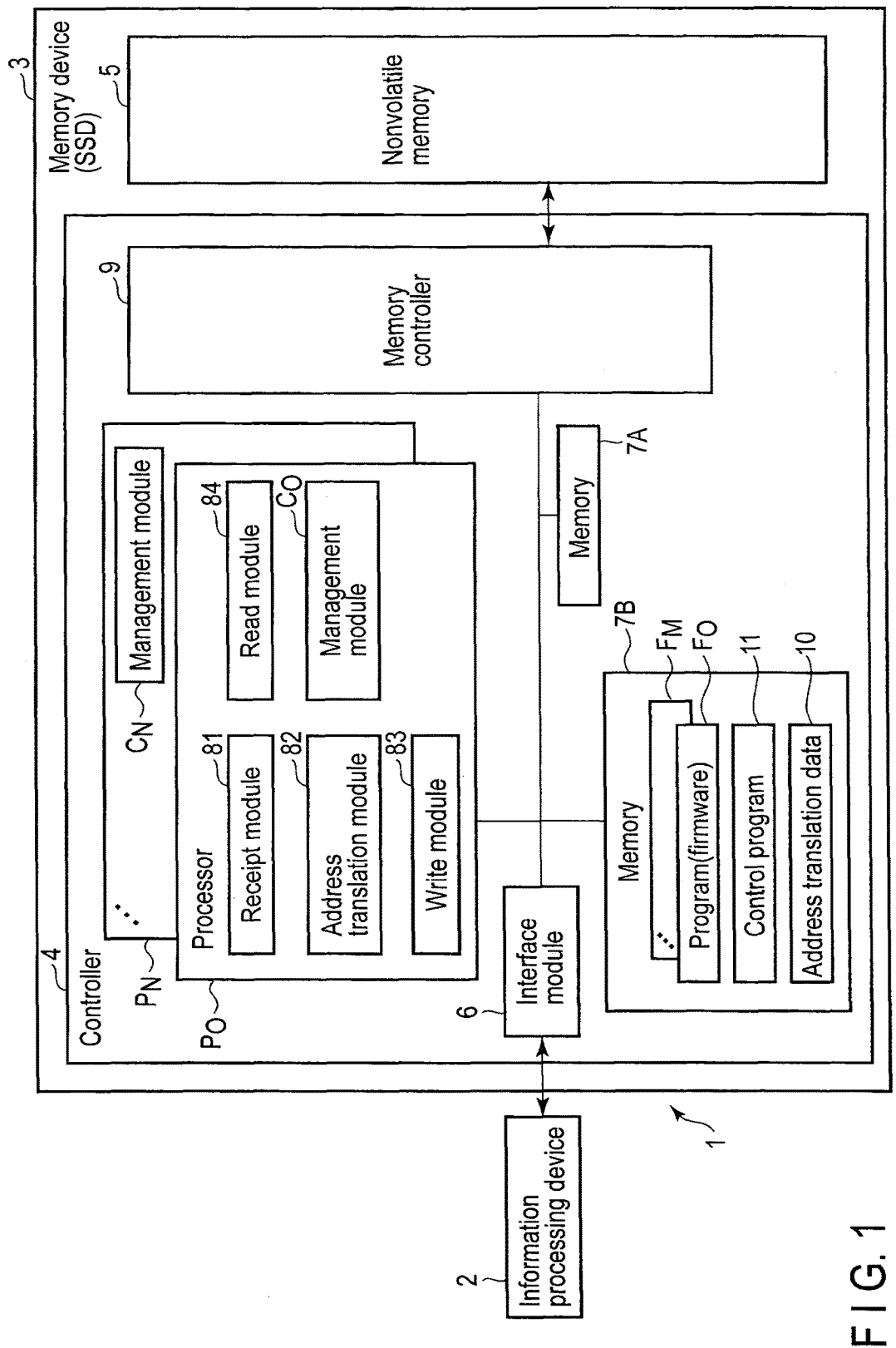
FIG. 1 is a block diagram showing an example of a configuration of an information processing system according to the first embodiment.

In general, according to one embodiment, a memory device includes a first memory being nonvolatile, a control circuit which controls the first memory, and a second memory storing a second program. The second program controls the control circuit in accordance with a command conforming to a specific interface and issued by a first program if the second program is executed by the control circuit. The second program manages management information associated with the first memory, and sends the management information conforming to the specific interface to the first program if the command is an output command to output the management information. The second program receives first information conforming to the specific interface and issued by the first program, translates the first information into second information corresponding to the second program, translates the second information into third information corresponding to the control circuit, and executes processing for the first memory in accordance with the third information.

Various embodiments will be described hereinafter with reference to the accompanying drawings. In the description below, the approximately-same functions and composition elements are represented by the same reference numbers and their overlapping descriptions are provided if necessary.

First Embodiment

The first embodiment is directed to a memory device with a software-defined platform.

The software-defined platform separates functions of the memory device from control by hardware, and executes control by software, for example.

In the first embodiment, it is assumed that the memory device is an SSD. However, other various memory devices, such as a memory card, a hard disk drive (HDD), a hybrid memory device including an HDD and an SSD, an optical disc, a storage device, a storage apparatus, and a memory server may be employed. When the memory device is the SSD, the memory device has the same communication interface as the HDD.

The memory device as the SSD includes a nonvolatile memory. The first embodiment is directed to a case where the nonvolatile memory includes a NAND flash memory. However, the nonvolatile memory may include a memory, other than the NAND flash memory, such as a NOR type flash memory, a magnetoresistive random access memory (MRAM), a phase change random access memory (PRAM), a resistive random access memory (ReRAM), or a ferroelectric random access memory (FeRAM). Further, the nonvolatile memory may also include a three-dimensional structural flash memory.

In the nonvolatile memory, data is simultaneously erased erasure-unit-area by erasure-unit-area. The erasure-unit-area includes a plurality of write-unit-areas and a plurality of read-unit-areas. If the nonvolatile memory is a NAND flash memory, the erasure-unit-area corresponds to a block. The write-unit-area and the read-unit-area each correspond to a page.

In the first embodiment, access means both a write to a memory and a read from the memory.

In the first embodiment, a unit of processing is assumed to be a task. However, another unit of processing, such as a job, a process, a transaction, or a thread, may be employed. For example, the thread is a minimum processing unit corresponding to parallel processing. In other words, the thread may be defined as a minimum unit that cannot be subjected to simultaneous processing if the thread is decomposed. For example, the task may include one or more threads. For example, the transaction is a processing unit managed for preventing inconsistency, and may include one or more processes. For example, the job may be defined as a unit of processing executed in accordance with a command issued by an information processing device or a program.

In the first embodiment, programs are defined as computer programs. Processing to be executed by a computer is described in the computer program in order. If the computer executes the programs, the programs can cause the computer to various functions such as issuing and receiving a command, data, information, etc., data processing, and data calculating.

In the first embodiment, the computer is, for example, a machine which executes calculating and processing in accordance with a command. For example, the computer includes a memory and a processor. The memory stores a program. The processor is hardware to execute a command set (for example, data transfer, calculation, process, control, or management) described in the program stored in the memory. In the fifth embodiment, the computer should be interpreted in a broad sense. For example, the computer includes an information processing device, a controller of a memory device, a personal computer, a micro computer, a server device, etc. In the fifth embodiment, a computer system in which computers operate in cooperation each other, may be used instead of the computer.

FIG. 1 is a block diagram showing an example of an information processing system according to the first embodiment.

An information processing system 1 includes an information processing device 2 and a memory device 3. The information processing device 2 is operable as a host device corresponding to the memory device 3.

The memory device 3 may be built in the information processing device 2, and may be connected to the information processing device 2 so that data can be transmitted therebetween. The memory device 3 may be connected to a plurality of information processing devices 2 so that communication is possible therebetween. Moreover, a plurality of memory devices 3 may be connected to one or more information processing devices 2 so that communication is possible therebetween.

The memory device 3 includes a controller 4 as an example of a control circuit, and a nonvolatile memory 5. The controller 4 and the nonvolatile memory 5 may be detachable, and the memory capacity of the memory device 3 may be arbitrarily extensible. Assume here that the memory capacity means a maximum amount of data writable to the memory.

A hardware part of the controller 4 includes an interface module 6, memories 7A and 7B, processors $P_0$ to $P_N$, and a memory controller 9. The controller 4 is electrically connected to, for example, the nonvolatile memory 5. The first embodiment is directed to a case where the controller 4 includes the processors $P_0$ to $P_N$. However, the number of processors included in the controller 4 can be arbitrarily changed. It is sufficient if at least one processor is provided.

The interface module 6 controls to transmit and receive data, information, signals, commands, messages, requests, instructions, etc., to and from an external device, such as the information processing device 2.

The memory 7A is used as a work memory. The memory 7A stores, for example, programs as processing targets of processors $P_0$ to $P_N$, data, information, etc. The memory 7A may be a volatile memory, such as a dynamic random access memory (DRAM) or a static random access memory (SRAM), or a nonvolatile memory.

The memory 7B is assumed to be a nonvolatile memory. However, a part of the memory 7B may be formed of a volatile memory. The memory 7B stores address translation data 10, a control program 11, and programs $F_0$ to $F_M$. Part or all of the address translation data 10, the control program 11 and the programs $F_0$ to $F_M$ may be stored in at least one of other memories, such as memories in the processors $P_0$ to $P_N$, the memory 7A and the nonvolatile memory 5.

Although in the example of FIG. 1, the controller 4 includes the programs $F_0$ to $F_M$, the number of programs employed in the controller 4 can be arbitrarily changed. It is sufficient if at least one program is provided.

The address translation data 10 is data that associates a logical address (for example, logical block addressing [LBA]) of write or read data with a physical address (for example, physical block addressing [PBA]) of the write or read data, and is, for example, a lookup table (LUT). The address translation data 10 may have a data structure of a table form, or may have another data structure of, for example, a list form.

The software-defined platform of the first embodiment includes the control program 11, the hardware part of the controller 4, and the nonvolatile memory 5. For instance, if the memory device 3 is an SSD, the control program 11, the hardware part of the controller 4, and the nonvolatile memory 5 are software-defined SSD platforms (memory device platforms). The use of the software-defined SSD platform enables functions of the SSD to be separate from hardware control and to be subjected to software control.

In the first embodiment, the platform means aggregation of hardware as a base needed for operating hardware or software, an operating system (OS), middleware, a combination thereof, setting, environment, etc.

The processors $P_0$ to $P_N$ execute the control program 11 and the programs $F_0$ to $F_M$. The processors $P_0$ to $P_N$ include management modules $C_0$ to $C_N$, respectively. However, the management modules $C_0$ to $C_N$ may be formed separate from the processors $P_0$ to $P_N$. In the first embodiment, assume that the processor $P_0$ is a master processor, and the processors $P_1$ to $P_N$ are subordinate processors that operate dependent on the master processor. In addition to a function as a master, the processor $P_0$ may includes a function as a subordinate processor. For example, as the management modules $C_0$ to $C_N$, queues may be used, and tasks (execution-waiting (execution-scheduled) tasks) to be executed may be managed in a first-in first-out scheme. However, the execution-waiting task in the management modules $C_0$ to $C_N$ may be managed in accordance with another way in which, for example, a task having a high priority among the execution-waiting tasks is executed.

The control program 11 abstracts the hardware part. For example, abstracting of the hardware part is realized by making data, information, signals, commands, messages, requests, instructions, etc., exchanged between the programs $F_0$ to $F_M$ and the control program 11, conform to a specific interface. For example, the programs $F_0$ to $F_M$ can used functions realized by the control program 11 by issuing commands conforming to the specific interface to the control program 11. The control program 11 executes processing for the hardware part in accordance with the command conforming to the specific interface and issued by the programs $F_0$ to $F_M$. The control program 11 translates information conforming to the specific interface from the programs $F_0$ to $F_M$ into information having a format corresponding to the hardware part.

In the first embodiment, for example, the specific interface is a standard and a procedure defined so that one program can use the other program. More specifically, for example, the specific interface is a standard defining a procedure, data format, etc., for calling a function, management data, etc., of one program from the other program, and using the called function, management data, etc.

The control program 11 is a common module which executes basic actions between the programs $F_0$ to $F_M$ and the hardware part to absorb the difference in hardware, so that the programs $F_0$ to $F_M$ will be independent of the hardware part, such as the controller 4 of the memory device 3. In the first embodiment, independency means property in which the programs can be continuously used even if at least part of cooperating software and hardware is exchanged. To this end, the control program 11 is in conformity with an application programming interface (API), a logical interface such as an LBA interface, and a physical interface such as an PBA interface. For instance, the control program 11 can exchange data, information, signals, commands, messages, requests, instructions, etc., with replaceable SSD modules independent of the hardware part, utilizing the API and the logical interface. For example, modules 131 to 136 shown in FIG. 4 described later may be SSD modules.

In the first embodiment, the physical interface, for example, may be a hardware interface.

In the first embodiment, the logical interface, for example, may be a software interface. For example, the logical interface is logically configured on the hardware interface, and is used for adding an address on the physical interface, and so forth.

For instance, the control program 11 includes a driver that receives, when executed in the hardware part of the controller 4, a command issued by anyone of the programs $F_0$ to $F_M$ through the specific interface defined for receiving commands, information, data, etc., to control the hardware part of the controller 4 and the nonvolatile memory 5 in accordance with the command. Thus, the control program 11 causes the hardware part of the controller 4 to access the nonvolatile memory 5.

Further, the control program 11 manages management information for the nonvolatile memory 5, and sends the management information to an issuing root of an output command in accordance with the specific interface, when the control program 11 receives the output command issued by anyone of the programs $F_0$ to $F_M$ to output the management information.

Furthermore, when the control program 11 receives setting information for processing for the nonvolatile memory 5 issued by anyone of the programs $F_0$ to $F_M$ in accordance with the specific interface, the control program 11 executes the processing for the nonvolatile memory 5, in accordance with the setting information.

In the first embodiment, the programs $F_0$ to $F_M$ may be combined arbitrarily.

The control program 11 performs, for example, scheduling of tasks. Thereby, the processor $P_0$ monitors states of the management modules $C_1$ to $C_N$ included in the processors $P_1$ to $P_N$ and allocates a task (or tasks) managed by the management module $C_0$ to one of the management modules $C_1$ to $C_N$ that has a small number of execution-waiting tasks. The processors $P_1$ to $P_N$ execute the tasks managed by the management modules $C_1$ to $C_N$, respectively.

In the embodiment, in the memories 7A and 7B, a storage position of the control program 11, storage positions of the programs $F_0$ to $F_M$, a work-area position of the control processing 11, and work-area positions of the programs $F_0$ to $F_M$ are determined when the memory device 3 is activated, and are not rearranged during its operation. Thus, times for re-arrangement are unnecessary for the memory device 3, and processing become high speed.

The programs $F_0$ to $F_M$ can use functions of the control program 11 by using an API, and operate in cooperation with the control program 11. The programs $F_0$ to $F_M$ are various types of software, such as firmware, an application program, a module and a handler. For example, the handler is a program which starts when processing request occurs. Although in the first embodiment, the programs $F_0$ to $F_M$ are firmware, the type of the programs $F_0$ to $F_M$ is not limited to it. In the first embodiment, for example, the programs $F_0$ to $F_M$ may be produced by a user of the memory device 3, or be produced by a manufacturer of the memory device 3.

For instance, the processors $P_0$ to $P_N$ function as a receipt module 81, an address translation module 82, a write module 83 and a read module 84 in cooperation with the control program 11 and the programs $F_0$ to $F_M$.

Since the programs $F_0$ to $F_M$ and the control program 11 cooperate in the memory device 3, a developer (or developers) of the programs $F_0$ to $F_M$ can create the programs $F_0$ to $F_M$ without consideration of the hardware part of the memory device 3.

The memory controller 9 controls access to the nonvolatile memory 5.

At the time of data writing, the information processing device 2 transmits, to the memory device 3, a write command, write data, and a logical address allocated to the write data.

The receipt module 81 realized by the processors $P_1$ to $P_N$ receives the write command, write data, and logical address from the information processing device 2 via the interface module 6.

When the receipt module 81 receives the write command, the address translation module 82 performs association processing, for the address translation data 10, for translating a logical address, attached to the write command, into a physical address in the nonvolatile memory 5.

The write module 83 writes the write data to a position in the nonvolatile memory 5 indicated by the physical address obtained by the address translation module 82 under the control of the memory controller 9.

At the time of data reading, the information processing device 2 transmits, to the memory device 3, a read command and a logical address allocated to read data.

The receipt module 81 receives the read command and the logical address from the information processing device 2 via the interface module 6.

When the receipt module 81 receives the read command, the address translation module 82 translates the logical address attached to the read command into a physical address, using the address translation data 10.

The read module 84 reads the read data from a position in the nonvolatile memory 5, indicated by the physical address, under the control of the memory controller 9. After that, the read module 84 transmits the read data to the information processing device 2 via the interface module 6.

Figure 2:
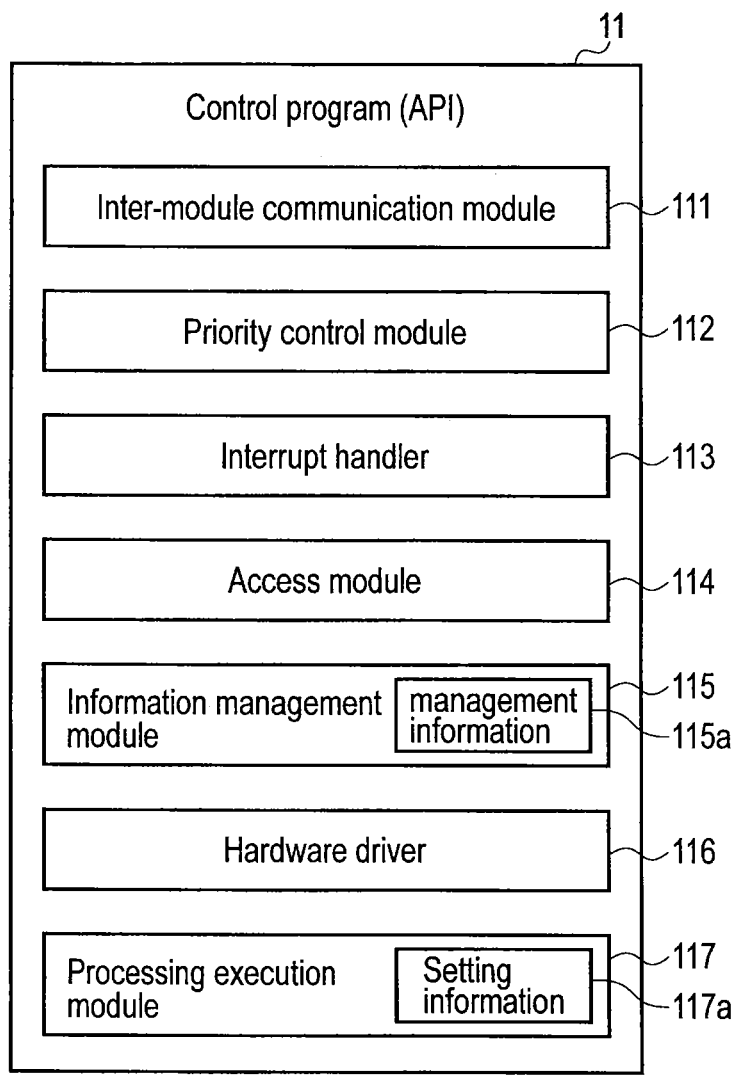
FIG. 2 is a block diagram showing an example of a configuration of a control program according to the first embodiment.

FIG. 2 is a block diagram showing an example of a configuration of the control program 11 according to the first embodiment.

The control program 11 is in conformity with the API. Therefore, the programs $F_0$ to $F_M$ can use various functions of the control program 11. For example, the API is specification used so that programs exchange data, information, signals, commands, messages, requests, instructions, etc., each other. For example, the API includes specification of a subroutine, a data structure, an object class, a variable, etc.

Moreover, the control program 11 is in conformity with, for example, the logical interface, and the physical interface. Accordingly, the memory device 3 can perform the same operations as an exemplary SSD. The logical interface has specifications that enable a logical address for, for example, software. The physical interface has specifications that enable a physical address for, for example, hardware.

For example, the control program 11 includes inter-module communication module 111, a priority control module 112, an interrupt handler 113, an access module 114, an information management module 115, a hardware driver 116 and a processing execution module 117.

The inter-module communication module 111 transmits and receives data, information, signals, commands, messages, requests, instructions, etc., between various programs, in accordance with the specific interface.

The priority control module 112 switches a to-be-executed program among the programs $F_0$ to $F_M$ in accordance with priority degrees of the programs $F_0$ to $F_M$. More specifically, the priority control module 112 manages the priority degrees of the programs $F_0$ to $F_M$ task by task, and executes a task of a higher priority preferentially.

The interrupt handler 113 detects an interrupt event from one of hardware or software of the memory device 3, and executes processing in accordance with a detected interrupt.

The access module 114 controls basic actions, such as erasure, reading, writing, etc., executed on the nonvolatile memory 5.

The information management module 115 manages various types of management information 115a for the nonvolatile memory 5. For example, the information management module 115 generates and manages the management information 115a that include statistical information, aggregation information, control information, etc. The management information 115a managed by the information management module 115 is information required at least for generation of setting information 117a used for processing for the nonvolatile memory 5. The management information 115a includes, for example, at least one of the number of erasures for each block of the NAND flash memory included in the nonvolatile memory 5, the frequency of erasures for each block, the number of reads for each page of the flash memory, the frequency of reads from each page, the number of writes to each page, the frequency of writes to each page, the dimension of each block, the number of pages in each block, the dimension of each page, an estimated write rate, an estimated write delay, an estimated read rate, an estimated read delay, and the like.

Upon receipt of a command to output the management information 115a from one of the programs $F_0$ to $F_M$, the information management module 115 sends the management information 115a to an issue origin of the output command.

The hardware driver 116 controls various types of hardware of the memory device 3. The hardware driver 116 includes various types of drivers such as a driver for controlling the interface module 6, a driver for controlling a power supply and a driving for controlling a timer.

Upon receipt of the setting information 117a for processing for the nonvolatile memory 5 from one of the programs $F_0$ to $F_M$, the processing execution module 117 performs processing for the nonvolatile memory 5, in accordance with the setting information 117a.

For instance, the setting information 117a may be set as a parameter used at least for the processing on the nonvolatile memory 5. More specifically, for example, the setting information 117a may be execution condition information for a garbage collection, and the processing execution module 117 may perform the garbage collection in accordance with the execution condition information. Moreover, for example, the setting information 117a may be write position information indicating in which position on the nonvolatile memory 5, what type of data is to be written, and the processing execution module 117 may write data in the position, indicated by the write position information, on the nonvolatile memory 5.

FIG. 3 is a block diagram showing an example of an installation state in the memory device 3 according to the first embodiment. Although FIG. 3 shows an example case where the program $F_0$ is installed, another program, such as the program $F_1, \ldots,$ or $F_M$, can be installed in the same way.

A manufacturer of the memory device 3 produces the memory device 3. In an initial stage, the memory device 3 includes a software-defined SSD platform including the control program 11, a hardware part 4H of the controller 4, and the nonvolatile memory 5. In the first embodiment, the memory device 3 does not have to include the programs $F_0$, such as firmware or an application program, in the initial stage. The initial stage means, for example, a shipping stage, a delivery stage or a sale stage. Further, in the initial stage, the memory device 3 may include a typical or standard program that is conformable to the software-defined platform and recommended by the manufacturer.

Further, the manufacturer provides or sells a software development device 13, which supports development of the program $F_0$, to the third party, such as a user, a customer, a buyer of the memory device 3, or a software developer. The first embodiment is directed to an example case where a software developer uses the software development device 13.

The software development device 13 includes an emulator of the nonvolatile memory 5 and a simulator of the memory device 3. This enables the software developer to develop the program $F_0$ using the software development device 13, even if, for example, a closed development environment physically isolated from an external network.

The software development device 13 assists development of the program $F_0$ by the software developer. The software developer may be, for example, a user or buyer of the memory device 3. In the first embodiment, the program $F_0$ is, for example, an interchangeable user-defined module, and is a high-order layer module of the control program 11.

Since the control program 11 is based on the API and the logical interface, the software developer can efficiently generate the program $F_0$ that satisfies a request by the user or buyer of the memory device 3. The control program 11 can operates in cooperation with the program $F_0$.

When the program $F_0$ is generated, the user or buyer of the memory device 3 or software developer will install it in the memory device 3.

Since in the first embodiment, the memory device 3 includes the control program 11, the program $F_0$ can operate without consideration of the hardware part 4H.

The user or buyer can easily install the program $F_0$ suitable for themselves in the memory device 3, and can use the program $F_0$.

In the first embodiment, the first interface or protocol is applied between the nonvolatile memory 5 and the hardware part 4H. The second interface or protocol is applied between the hardware part 4H and the control program 11. The third interface or protocol is applied between the programs $F_0$ to $F_M$ and the control program 11. As a result, even if at least part of the nonvolatile memory 5, the hardware part 4H, the control program 11 and the programs $F_0$ to $F_M$ is exchanged for another, the other software or hardware can be used continuously.

FIG. 4 is a block diagram showing an example of a relationship between structural elements of the information processing system 1 according to the first embodiment.

The memory device 3, which mainly includes two abstraction layers, assists development of interchangeable SSD modules 131 to 137. Programs $F_0$ to $F_M$ correspond to interchangeable SSD modules 133 to 136.

The first abstraction layer includes a software-defined SSD platform. The software-defined SSD platform includes the control program 11, the hardware part 4H and the nonvolatile memory 5. The software-defined SSD platform is generated by, for example, the manufacturer of the memory device 3, and is installed in the memory device 3. In the first abstraction layer, for example, the nonvolatile memory 5 includes a plurality of NAND flash memory $B_0$ to $B_P$.

The second abstraction layer includes the interchangeable SSD modules 131 to 137. The second abstraction layer performs memory control in an upper layer. The interchangeable SSD modules 131 to 136 can exchange data, information, signals, commands, messages, requests, instructions, etc., with the control program 11 via, for example, the API and the logical interface. In the second abstraction layer, the interrupt handler 137 can exchange data, information, signals, commands, messages, requests, instructions, etc., with the hardware part 4H, without using the control program 11.

In the second abstraction layer, the SSD module 131 and new SSD module 132, which are produced by, for example, the manufacturer, are installed in the memory device 3 as standard SSD modules or functions.

The modules 133 to 135, the driver module 136, and the interrupt handler 137 are produced by the third party, such as the software developer, and are installed in the memory device 3.

The SSD module 131, the new module 132, and the modules 133 to 135 can exchange data, information, signals, commands, messages, requests, instructions, etc., with drivers 141 to 145 provided in an external device, such as the information processing device 2.

The driver module 136 and the interrupt handler 137 can exchange data, information, signals, commands, messages, requests, instructions, etc., with an external hardware part 146, such as a network device, a camera or a sensor. The driver module 136 can control the external hardware part 146. The interrupt handler 137 detects an interrupt event from the external hardware part 146 or the hardware part 4H, and performs processing corresponding to a detected interrupt on the hardware part 4H or the external hardware part 146.

The modules 133 to 135 and the driver module 136 can exchange data, information, signals, commands, messages, requests, instructions, etc., with the control program 11 in accordance with the specific interface.

FIG. 5 is a flowchart showing an example of processing performed by the control program 11 and the hardware part 4H according to the first embodiment.

In step S501, the control program 11 receives an access command from one of the programs $F_0$ to $F_M$ in accordance with the specific interface. For example, the control program 11 receives a write command, a logical address and write data. For example, the control program 11 receives a read command and a logical address.

In step S502, the control program 11 and the hardware part 4H translate the logical address into a physical address in accordance with an access command, and write or read data to or from the nonvolatile memory 5. If the read data is read from the nonvolatile memory 5, the control program 11 sends the read data to an issue source of the read command.

In step S503, the control program 11 generates the management information 115a for the nonvolatile memory 5.

In step S504, the control program 11 receives a command to output the management information 115a from one of the programs $F_0$ to $F_M$ in accordance with the specific interface.

In step S505, the control program 11 sends the management information 115a to the issue source of the output command, in accordance with the output command.

In step S506, the control program 11 receives a processing execution command and the setting information 117a from one of the programs $F_0$ to $F_M$ in accordance with the specific interface.

In step S507, the control program 11 and the hardware part 4H perform processing for the nonvolatile memory 5 in accordance with the processing execution command and the setting information 117a.

In the first embodiment described above, independently of the hardware part 4H of the memory device 3, the programs $F_0$ to $F_M$ and the interchangeable SSD modules 131 to 136 can be produced and installed in the memory device 3, and the memory device 3 can be used.

Thus, the convenience of the memory device 3 is enhanced.

In the first embodiment, even if the hardware part 4H of the memory device 3 is changed or upgraded, the programs $F_0$ to $F_M$ and the interchangeable SSD modules 131 to 136 can be continuously used in the new memory device 3.

Accordingly, the programs $F_0$ to $F_M$ and the interchangeable SSD modules 131 to 136 can be developed without consideration of the hardware part 4H of the memory device 3.

Even in a case of introducing a new memory device 3, the user or buyer of the memory device 3 can continuously use previously-produced programs $F_0$ to $F_M$ and interchangeable SSD modules 131 to 136 in the new memory device 3.

Therefore, in the first embodiment, the labor, cost and time required for the development and maintenance of the memory device 3 can be reduced, thereby enhancing the efficiency of the development.

In the first embodiment, the user or buyer of the memory device 3 can use the programs $F_0$ to $F_M$ and interchangeable SSD modules 131 to 136 suitable for themselves. Therefore, the user can easily employ their own know-how when using the memory device 3.

The first embodiment enables the manufacturer of the memory device 3 to produce and sell a large number of memory devices 3.

In the first embodiment, the user can uniquely develop the programs $F_0$ to $F_M$ and interchangeable SSD modules 131 to 137, such as firmware or application programs, and can easily install them in the memory device 3.

In the first embodiment, the memory device 3 can be easily connected to the external hardware part 146, such as a network device, a camera or a sensor, and can easily write, to the nonvolatile memory 5, data received from the external hardware part 146. In other words, in the first embodiment, the memory device 3 can easily mount a communication interface for the external hardware part 146 by including the driver module 136. This means that the memory device 3 of the first embodiment is suitable for, for example, Internet of Things (IoT).

For example, the manufacturer of the memory device 3 according to the first embodiment provides the user or buyer of the nonvolatile memory 5 produced by the manufacturer, with at least one of the control program 11, the hardware part 4H and the software development device 13 at a low price or without charge. This can promote sale of the nonvolatile memory 5 by the manufacturer of the memory device 3.

In the first embodiment, even before the sale or delivery of the memory device 3, the software developer can generate the programs $F_0$ to $F_M$ and the interchangeable SSD modules 131 to 137, using the software development device 13. In the first embodiment, the manufacturer of the memory device 3 can quickly sell or deliver the memory device 3, without developing a program unique to the user or buyer. Therefore, the period required after manufacturing of the memory device 3 until delivery of the memory device 3 for the user or buyer can be shortened.

The user or buyer of the memory device 3 can freely change execution conditions for a garbage collection, and can freely determine whether the garbage collection should be canceled, or to which position in the nonvolatile memory 5 and what data should be written. As a result, a life of the nonvolatile memory 5 can be elongated in accordance with a state of use of the user.

In the first embodiment, the storage position of the control program 11, the storage positions of the programs $F_0$ to $F_M$, the work-area position of the control program 11, and the work-area positions of the programs $F_0$ to $F_M$ are determined when the memory device 3 is activated, and are not rearranged during its operation. Thus, it is not necessary to rearrange programs and data, and hence the memory device 3 can be operated at high speed.

In the first embodiment, even if at least part of the nonvolatile memory 5, the hardware part 4H, the control program 11, the programs $F_0$ to $F_M$ and the exchangeable SSD modules 131 to 137 is exchanged for another, the other software or hardware can be used continuously. For example, even if the nonvolatile memory 5 is modified during its development, existing programs $F_0$ to $F_M$, exchangeable SSD modules 131 to 137, hardware module 4H of the controller 4 and control program 11 can be reused.

Second Embodiment

The second embodiment is directed to a modification of the information processing system 1 explained in the first embodiment.

In the second embodiment, the memory device 3 allocates virtual memory devices (virtual SSDs) to respective virtual machines.

FIG. 6 is a block diagram showing an example of a relationship between structural elements of an information processing system according to the second embodiment.

An information processing system 1A according to the second embodiment includes the memory device 3 and virtual machines $VM_0$ to $VM_P$.

The memory device 3 has a large memory capacity. The memory device 3 includes virtual memory devices $VS_0$ to $VS_P$, the control program 11, and the NAND flash memories $B_0$ to $B_P$. The NAND flash memories $B_0$ to $B_P$ correspond to the nonvolatile memory 5 of FIG. 1.

The virtual memory devices $VS_0$ to $VS_P$ are associated with the virtual machines $VM_0$ to $VM_P$, respectively. The virtual memory devices $VS_0$ to $VS_P$ are operable independently of each other, thereby realizing stable performance.

The control program 11 can operate in accordance with on a common command set. The control program 11 cooperates with the virtual memory devices $VS_0$ to $VS_P$ in the memory device 3. The control program 11 individually changes and manages parameters of the virtual memory devices $VS_0$ to $VS_P$.

For instance, the control program 11 can change a memory capacity, setting of a garbage collection, setting of over-provisioning, setting of a granularity and reliability (error correction capacity) degree of each of virtual memory devices $VS_0$ to $VS_P$. The garbage collection is a function of automatically releasing an unnecessary area included in memory areas dynamically secured by programs. The over-provisioning means securing of a provisional area. The granularity means, for example, the size of unit of writing, the size of unit of reading and the size of unit of erasure, such as block and page sizes of a NAND flash memory or the sector size of a hard disk.

The control program 11 can change, when necessary, the number of virtual memory devices $VS_0$ to $VS_P$ and the memory capacity of each of the virtual memory devices $VS_0$ to $VS_P$.

The control program 11 includes software ports corresponding to respective virtual memory devices $VS_0$ to $VS_P$. The control program 11 allocates the NAND flash memories $B_0$ to $B_P$ to the virtual memory devices $VS_0$ to $VS_P$, respectively. For instance, the control program 11 manages the NAND flash memories $B_0$ to $B_P$ allocated to the virtual memory devices $VS_0$ to $VS_P$, using namespaces corresponding to the virtual memory devices $VS_0$ to $VS_P$. In other words, the nonvolatile memory 5 is divided into a plurality of namespaces, and the virtual memory devices $VS_0$ to $VS_P$ are associated with the respective namespaces.

In the second embodiment, the namespace is a memory space obtained by grouping a plurality of blocks included in the nonvolatile memory 5. By allocating respective namespaces to the virtual memory devices $VS_0$ to $VS_P$, appropriate data can be accessed using namespace identification data and a logical address, even when the logical address overlaps between at least two of the virtual memory devices $VS_0$ to $VS_P$.

In the second embodiment described above, the single memory device 3 can be treated as a plurality of virtual memory devices $VS_0$ to $VS_P$, thereby further enhancing the convenience of the memory device 3.

In the second embodiment, since allocation of the NAND flash memories $B_0$ to $B_P$ to the virtual memory devices $VS_0$ to $VS_P$ is managed using the namespaces, the accuracy of access to the NAND flash memories $B_0$ to $B_P$ by the virtual memory devices $VS_0$ to $VS_P$ can be enhanced.

In the second embodiment, since the virtual memory devices $VS_0$ to $VS_P$ are operable independently of each other, stable performance can be realized.

Third Embodiment

The third embodiment is directed to a modification of the above-described first and second embodiments, wherein a memory device controls a plurality of processors using the control program 11 including a scheduler.

Figure 7:
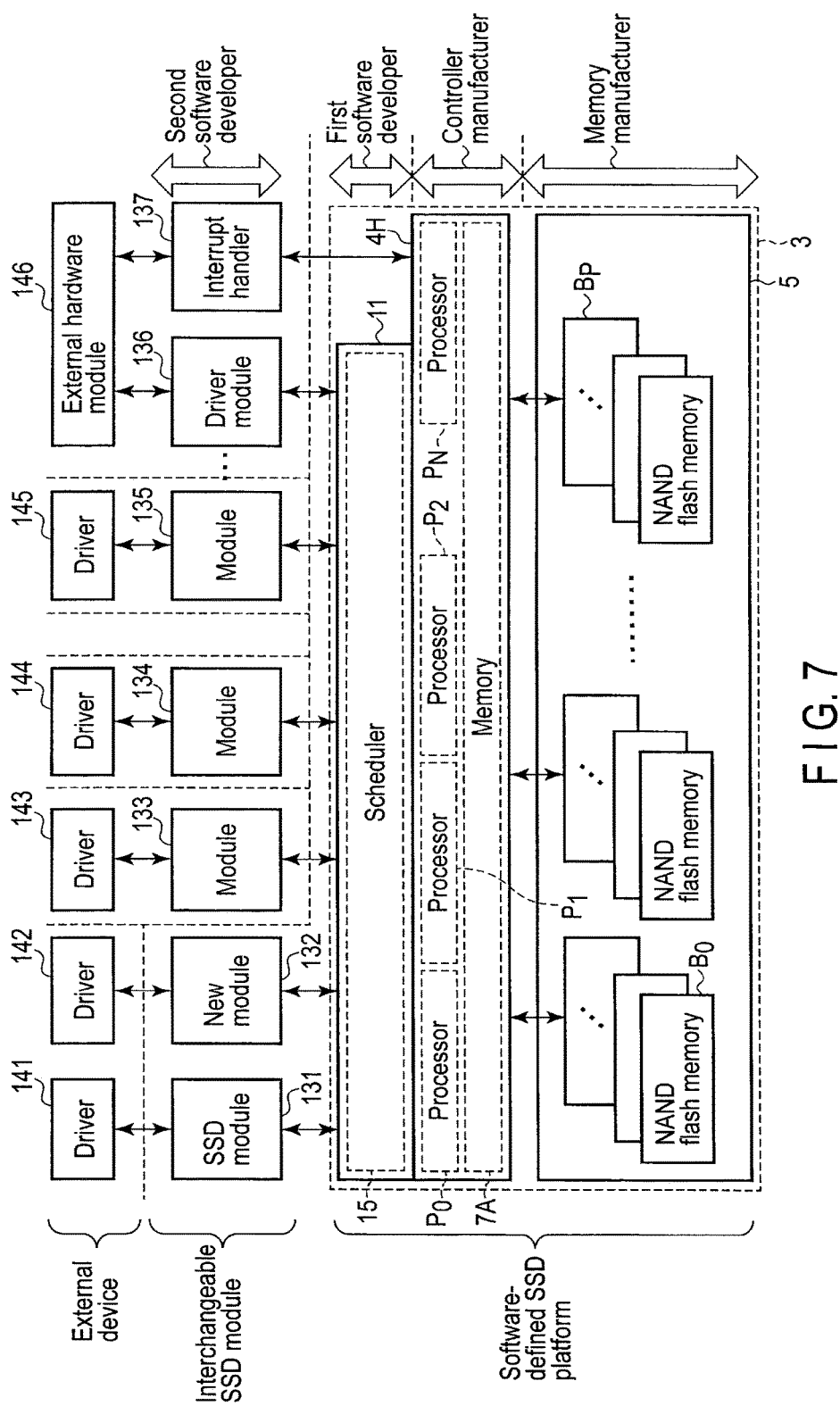
FIG. 7 is a block diagram showing an example of a relationship between structural elements of a memory device according to the third embodiment.

FIG. 7 is a block diagram showing an example of a relationship between the structural elements of the memory device 3 according to the third embodiment. In FIG. 7, the control program 11, modules 131 to 136, and interrupt handler 137 are assumed to be software. Drivers 141 to 145 and an external hardware module 146 are assumed to be hardware.

The memory device 3 includes the control program 11, the hardware part 4H, and a plurality of NAND flash memories $B_0$ to $B_P$. The hardware part 4H includes a plurality of processors $P_1$ to $P_N$ and a memory 7A.

The control program 11 includes a function as a scheduler 15. The scheduler 15 may be realized by hardware.

The memory 7A is shared by the processors $P_1$ to $P_N$. Data, information, signals, commands, messages, requests, and/or instructions can be exchanged between the processors $P_1$ to $P_N$ by storing the data, information, signals, commands, messages, requests, and/or instructions into the memory 7A by one of the processors $P_1$ to $P_N$, and reading the data, information, signals, commands, messages, requests, and/or instructions from the memory 7A by another of the processors $P_1$ to $P_N$.

For example, data, information, signals, commands, messages, requests, and/or instructions are assumed to be exchangeable between the modules 131 to 136, and the control program 11 in accordance with the standard specific interface.

For example, data, information, signals, commands, messages, requests, and/or instructions are assumed to be exchangeable between the SSD modules 131 to 136, and drivers 141 to 145 and the external hardware part 146 included in an external device in accordance with an unique interface. The external hardware part 146 may be set as an external memory device with respect to the memory device 3, or may also be set as an external NAND flash memory.

For example, a plurality of NAND flash memories $B_0$ to $B_P$ are manufactured by the same manufacturer as that of the nonvolatile memory 5.

For example, the hardware part 4H is manufactured by the same manufacturer as that of the controller 4.

For example, the control program 11 is produced by the same manufacturer as that of the nonvolatile memory 5, the same manufacturer as that of the controller 4, or the first software developer.

For example, the modules 131 and 132 are produced by the same manufacturer as that of the nonvolatile memory 5, the same manufacturer as that of the controller 4, or the first software developer.

For example, the modules 133 to 135, the driver module 136 and the interrupt handler 137 are produced by the second software developer.

In the third embodiment, for example, the scheduler 15 dynamically determines which processor should perform which task. In other words, for example, the scheduler 15 includes a dynamic task scheduler.

A description will now be given of an example of control executed by the control program 11 according to the third embodiment.

Figure 8:
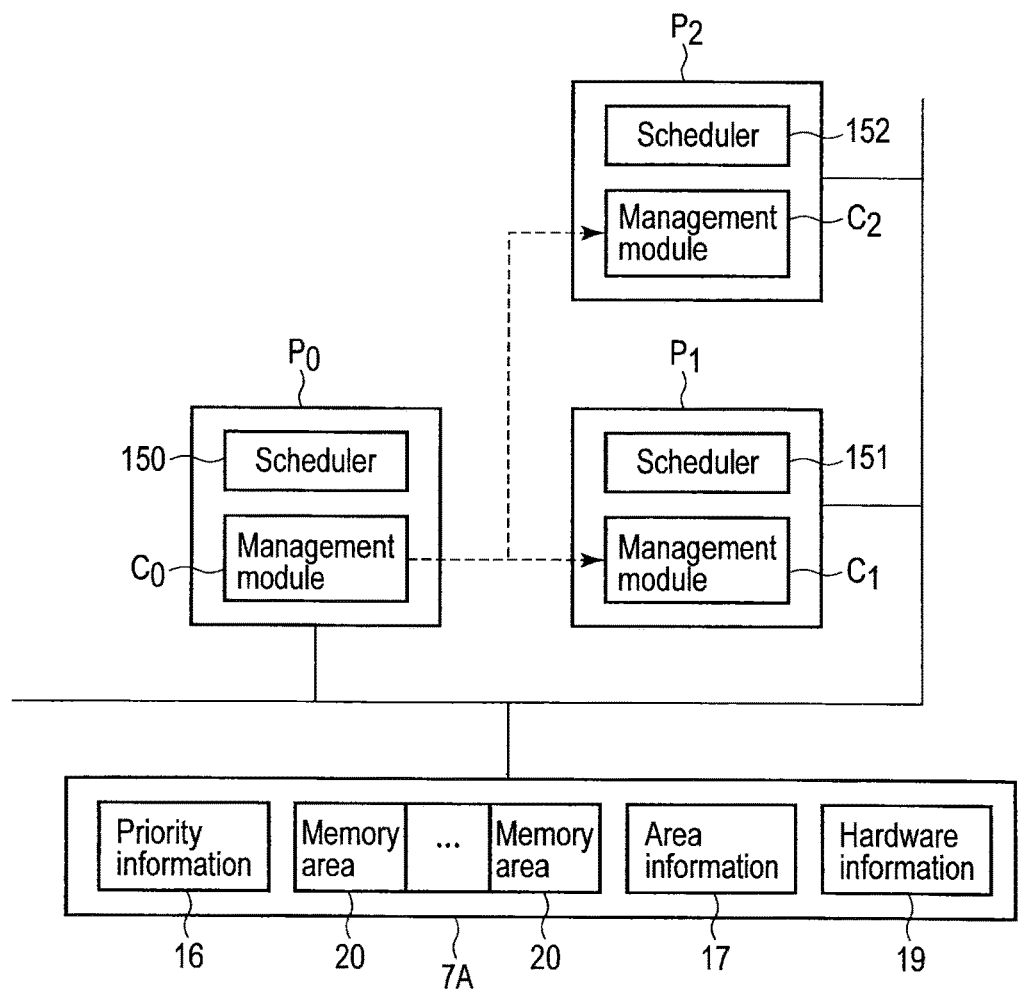
FIG. 8 is a block diagram showing an example of a relationship between processors and a memory according to the third embodiment.

FIG. 8 is a block diagram showing an example of a relationship between the processors $P_1$ to $P_N$ and the memory 7A according to the third embodiment. FIG. 8 shows, as an example, the case of three processors, for simplifying the description. However, the same applies to the case of four or more processors. Further, if the processor $P_0$ as a master also has a function as a subordinate processor, it is sufficient if at least two processors exist.

The processors $P_0$ to $P_2$ include the management modules $C_0$ to $C_2$ and the schedulers 150 to 152, respectively. The processors $P_0$ to $P_2$ control other hardware in the hardware part 4H, thereby controlling writes of write data to the nonvolatile memory 5, reads of read data from the nonvolatile memory 5, and erasures of written data from the nonvolatile memory 5.

The management module $C_0$ corresponds to the processor $P_0$, and can manage a plurality of processing (execution-wait (execution-scheduled) processing) to be executed, and an order of execution of the processing.

The management module $C_1$ can manage execution-wait processing to be executed by processor $P_1$, and an order of execution.

The management module $C_2$ can manage execution wait processing to be executed by processor $P_2$, and an order of execution.

Although in the third embodiment, the maximum number of tasks manageable by each of management modules $C_1$ and $C_2$ is set to two, it may be set to three or more.

The scheduler 15 includes scheduler 150 that performs scheduling using processor $P_0$, scheduler 151 that performs scheduling using processor $P_1$, and scheduler 152 that performs scheduling using processor $P_2$. However, the scheduler 15 may operate concentrically using, for example, the processor $P_0$, without dispersion.

The scheduler 150 is a master scheduler, and distributes execution-wait tasks, managed by the management module $C_0$, to the schedulers 151 and 152 so that the loads of subordinate processors $P_1$ and $P_2$ or the numbers of execution-wait tasks in management modules $C_1$ and $C_2$ will be equal.

The schedulers 151 and 152 are subordinate schedulers and shorten processing times and delay times of processors $P_1$ and $P_2$, respectively.

The scheduler 151 and 152 detect the numbers of tasks of the management modules $C_1$ and $C_2$, respectively.

The scheduler 151 determines whether the number of execution-wait tasks managed by the management module $C_1$ is not more than the first threshold, and sends a determination result to the master scheduler 150.

The scheduler 152 determines whether the number of execution-wait tasks managed by the management module $C_2$ is not more than the second threshold, and sends a determination result to the master scheduler 150.

If the number of execution-wait tasks managed by the management module $C_1$ is not more than the first threshold, the scheduler 150 notifies the scheduler 151 of an execution-wait task managed by management module $C_0$. The scheduler 151 manages the execution-wait task, notified by the scheduler 150, using the management module $C_1$.

If the number of execution-wait tasks managed by the management module $C_2$ is not more than the second threshold, the scheduler 150 notifies the scheduler 152 of an execution-wait task managed by management module $C_0$. The scheduler 151 manages the execution-wait task, notified by the scheduler 150, using the management module $C_2$.

In the third embodiment, the scheduler 150 stores, in the memory 7A, priority information 16 that associates task identification information for identifying execution-wait task, with an execution priority of each execution-wait task.

If a module managing an execution-wait task is changed from the management module $C_0$ to the management module $C_1$ or the management module $C_2$, the scheduler 150 refers to the priority information 16, and determines an execution-wait task of a high priority managed by the management module $C_0$, as a task whose management module is to be changed. More specifically, the scheduler 150 may determine, for example, an execution-wait task of the highest priority as a task whose management module is to be changed. For example, the scheduler 150 may determine, as the task whose management module is to be changed, one of the execution-wait tasks that are included in the execution-wait tasks managed by the management module $C_0$, and fall within a group of tasks having higher priority degrees. For example, when the management module $C_0$ manages an execution-wait task having a priority degree not less than a predetermined value, the scheduler 150 may determine the execution-wait task having the priority degree not less than the predetermined degree as a task whose management module is to be changed. In contrast, when the management module $C_0$ does not manage an execution-wait task having a priority degree not less than the predetermined degree, the scheduler 150 may determine, in the first-in first-out scheme, a task whose management module is to be changed.

A description will now be given, using the processor $P_1$, of the same processing executed by the processors $P_1$ and $P_2$. Regarding the processor $P_2$, a brief description may be given thereof, or its description may be omitted.

After the processor $P_1$ finishes execution of a task, the scheduler 151 executes a subsequent task managed by the management module $C_1$.

When executing the subsequent task managed by the management module $C_1$, the scheduler 151 refers to the priority information 16, and determines, as the subsequent task, an execution-wait task of a high priority managed by the management module $C_1$. More specifically, the scheduler 151 may determine, for example, a task of the highest priority as the subsequent task. For example, the scheduler 151 may determine, as the subsequent task, one of tasks that are included in the tasks managed by the management module $C_1$ and belong to a higher-priority group. For example, when the management module $C_1$ manages a task having a priority degree not less than a predetermined value, the scheduler 151 may determine, as the subsequent task, the task having the priority degree not less than the predetermined value. In contrast, when the management module $C_1$ does not manage a task having a priority degree not less than the predetermined value, the scheduler 151 may determine the subsequent task in the first-in first-out scheme.

If the processor $P_1$ finishes execution of the subsequent task, the scheduler 151 provides the scheduler 150 with task end information indicating an end of the task execution. When the management module $C_0$ manages an execution-wait task, the scheduler 150 determines a task whose management module is to be changed, and notifies the scheduler 151, which has issued the task end information, of the task whose management module is to be changed. The scheduler 151 manages the task notified by the scheduler 150, using the management module $C_1$.

If a new task is activated subsequent to the task executed by the processor $P_1$, and is executed by one processor of the processors $P_1$ and $P_2$, the scheduler 151 may notify the new task to a scheduler corresponding to the one processor. In this case, the scheduler corresponding to the one processor causes a management module corresponding to the one processor to manage the new task.

If a new task is activated subsequent to the task executed by the processor $P_1$, and is executable by any one of the processors $P_1$ and $P_2$, the scheduler 151 may notify the new task to the scheduler 150 corresponding to the processor $C_0$. In this case, the scheduler 150 causes the management module $C_0$ to manage the new task.

If a new task is activated subsequent to the task executed by the processor $P_1$, and is executable by any one of the processors $P_1$ and $P_2$, and if the number of tasks managed by the management module $C_1$ is not more than the first threshold, the scheduler 151 may notify the new task to the scheduler 151 corresponding to the processor $C_1$. In this case, the scheduler 151 causes the management modules $C_1$ to manage the new task.

If a new task is activated subsequent to the task executed by the processor $P_1$, and is executable by any one of the processors $P_1$ and $P_2$, and if the number of tasks managed by the management module $C_2$ is not more than the second threshold, the scheduler 151 may notify the new task to the scheduler 152 corresponding to the processor $C_2$. In this case, the scheduler 152 causes the management module $C_2$ to manage the new task.

If a new task is activated subsequent to the task executed by the processor $P_1$, and is executable by any one of the processors $P_1$ and $P_2$, and if the numbers of tasks managed by the management modules $C_1$ and $C_2$ are not more than the first and second thresholds, respectively, the scheduler 151 may notify the new task to the scheduler 150 corresponding to the processor $C_0$. In this case, the scheduler 150 causes the management module $C_0$ to manage the new task.

The tasks executed by the processors $P_1$ and $P_2$ do not include a wait task which does not includes waiting for accessing the hardware part 4H. For example, the wait task may be a task which becomes a waiting state until occurring a specific event. In this case, if execution of a task is started by processor $P_1$ or $P_2$, discontinuation does not occur except for a case where the processor $P_1$ or $P_2$ receives an interrupt and hence exceptional processing occurs.

The control program 11 allocates memory areas 20 in the memory 7A to all tasks, based on the time of an activation of the memory device 3, or before the tasks managed by the management modules $C_1$ and $C_2$ are executed by the processors $P_1$ and $P_2$.

The control program 11 stores, in the memory 7A, area information 17 that associates to-be-executed tasks with the memory areas 20 allocated to the to-be-executed tasks. The control program 11 refers to the area information 17, and determines the memory areas 20 used when executing the tasks.

If stopping at least one of processor $P_1$ and $P_2$, the control program 11 stops change of a management module of a task from the management module $C_0$ corresponding to the processor $P_0$ to a management module corresponding to one processor to be stopped, and changes the management module of the task from the management module $C_0$ corresponding to the processor $P_0$ to a management module corresponding to the other processor that is not stopped. For instance, the processor is stopped by stopping the supply of power.

If the processor $P_1$ receives an interrupt, the control program 11 causes the management module $C_1$ corresponding to the processor $P_1$ to manage a task subsequent to the interrupt.

The control program 11 stores, in the memory 7A, hardware information 19 that associates a task with hardware identification information for identifying part of the hardware part 4H used to execute the task, if the task needs to be executed by the part of the hardware part 4H. The control program 11 refers to the hardware information 19, and determines a hardware part used for the execution of the task, when executing the task. Subsequently, the control program 11 manages the task, using a management module corresponding to the determined hardware part. Specifically, upon receipt of an access request and hardware identification information from the information processing device 2, the control program 11 stores, in the memory 9, the hardware information 19 that associates a task, corresponding to the access request, with the hardware identification information. When executing the task corresponding to the access request, the control program 11 manages the task using a management module corresponding to a processor indicated by the hardware identification information.

FIG. 9 is a flowchart showing an example of the first processing executed by the scheduler 15 according to the third embodiment. More specifically, FIG. 9 shows an example of processing executed until a management module of a task is changed from the management module $C_0$ to the management module $C_1$. However, the same applies to processing executed until the management module of the task is changed from the management module $C_0$ to another management module, such as the management modules $C_2$.

In step S901, the scheduler 15 manages tasks using the management module $C_0$.

In step S902, the scheduler 15 determines whether the number of tasks managed by the management module $C_1$ is not more than the first threshold.

If the number of tasks managed by the management module $C_1$ is more than the first threshold, the processing proceeds to step S905.

If the number of tasks managed by the management module $C_1$ is not more than the first threshold, the scheduler 15 refers to the priority information 16 and selects, in step S903, a task whose management module should be changed from the management module $C_0$ to the management modules $C_1$.

In step S904, the scheduler 15 changes the management module of the selected task to the management module $C_1$.

If it is determined in step S905 that the processing is to be continued, the scheduler 15 returns to step S901. In contrast, if it is determined that the processing should not to be continued, the scheduler 15 finishes the processing.

FIG. 10 is a flowchart showing an example of the second processing executed by the scheduler 15. More specifically, FIG. 10 shows an example of processing executed after a new task is activated subsequent to an executed task, until the new task is allocated to one of the management modules $C_0$ to $C_2$.

In step S1001, the scheduler 15 determines whether the new task activated subsequent to the already executed task is to be executed by processor $P_1$, whether the new task activated subsequent to the already executed task is to be executed by processor $P_2$, or whether the new task activated subsequent to the already executed task is executable by any one of the processors $P_1$ and $P_2$.

If it is determined that the new task is to be executed by the processor $P_1$, the scheduler 15 manages, in step S1002, the new task using the management module $C_1$.

In contrast, if it is determined that the new task is to be executed by the processor $P_2$, the scheduler 15 manages, in step S1003, the new task using the management module $C_2$.

If the new task can be executed by any one of the processors $P_1$ and $P_2$, the scheduler 15 manages the new task using the management module $C_0$ in step S1004.

FIG. 11 is a block diagram showing an example of a notification state of area information between tasks according to the third embodiment.

The first task $T_1$ is performed by any one of the processors $P_1$ and $P_2$. A memory area 181 is a memory area used by the first task $T_1$.

The second task $T_2$ is performed by any one of the processors $P_1$ and $P_2$.

The second task $T_2$ uses part or all of the memory area 181 that is used by the first task $T_1$. In this case, the first task $T_1$ notifies the second task $T_2$ of area information on the memory area 181. The area information includes position information of the memory area 181, for example.

The area information may be notified from the first task $T_1$ to the second task $T_2$ when the memory device 3 is powered on, and when the memory area 181 has been allocated to the task $T_1$. Alternatively, the area information may be notified from the first task $T_1$ to the second task $T_2$ by activation of the second task $T_2$.

In the third embodiment, even if execution of a task is finished, the control program 11 does not allocate, to another task, a memory area corresponding to the executed task. Furthermore, when the same task is re-executed after execution of a task is finished, the same memory area is re-used.

The tasks may include a task of booting a program. In this case, a task of executing power supply processing is managed by any one of the management modules $C_0$ to $C_2$ of the processors $P_0$ to $P_2$, based on supply of power to the memory device 3.

At least one of the hardware part 4H and the control program 11 may perform error detection. When an error is detected, a task of performing error correction processing is managed by one of the management modules $C_0$ to $C_2$ of the processors $P_0$ to $P_2$.

In the third embodiment, the control program 11 of the memory device 3 may send, to, for example, modules 131 to 136, memory information, such as the number of erasures block by block in the NAND flash memories $B_0$ to $B_P$, the number of pages in each block, block size, page size, etc.

Upon receipt of, from a task, a request to allocate the NAND flash memories $B_0$ to $B_P$ or to release them, the control program 11 may execute allocation or release processing, and notify the task of an allocated block or released block in the NAND flash memories $B_0$ to $B_P$.

FIG. 12 is a block diagram showing an example of a relationship between the tasks and memory areas according to the third embodiment.

At least one of tasks $T_1$ to $T_3$ may receive requests from the other tasks.

When the task $T_1$ has been executed, the task $T_1$ sends, to the task $T_2$, a request and identification information corresponding to the task $T_1$ issuing the request. Further, the task $T_1$ stores information acquired by execution of the task $T_1$ in the memory area 181 corresponding to the task $T_1$, or in the memory area 182 corresponding to the task $T_2$.

The task $T_2$ is executed using the information stored in the memory area 181 or 182. Thus, the task $T_2$ sends, to the task $T_3$ to be executed after the task $T_2$, a request and identification information corresponding to the task $T_2$ issuing the request. Furthermore, the task $T_2$ stores information acquired by execution of the task $T_2$ in the memory area 182 corresponding to the task $T_2$, or in the memory area 183 corresponding to the task $T_3$.

For example, if the task $T_2$ receives requests from the other tasks, the task $T_1$ sends, to the task $T_2$, identification information of the task $T_1$ issuing the request, and identification information of the task $T_3$ to be executed after the task $T_2$. The task $T_2$ is executed using the information stored in the memory area 181 corresponding to the task $T_1$ or the information stored in the memory area 183 corresponding to the task $T_3$. Thus, the task $T_2$ stores information acquired by execution of the task $T_2$ in the memory area 181 corresponding to the task $T_1$, or in the memory area 183 corresponding to the task $T_3$.

For example, if the task $T_2$ receives requests from the other tasks, the task $T_1$ sends, to the task $T_2$, identification information of the task $T_1$ issuing the request, and identification information of the task $T_3$ to be executed after the task $T_2$. The task $T_2$ is executed using the information stored in the memory area 181 corresponding to the task $T_1$. Thus, the task $T_2$ stores information acquired by execution of the task $T_2$ in the memory area 183 corresponding to the task $T_3$.

Upon receipt of a command and identification information for subsequent processing from the information processing device 2, the control program 11 may perform a task indicated by the identification information for the subsequent processing, after executing the command. Thus, even if processing is executed in accordance with the same command, subsequent processing can be switched.

For instance, the hardware part 4H of the memory device 3 may be divided into a plurality of portions, and the identification information for the subsequent processing may indicate a portion of the hardware part 4H.

The identification information for the subsequent processing may be a queue number of a command queue managed in the memory device 3.

In the third embodiment described above, the memory device 3 employs a memory-shared type parallel computing system (symmetric multiprocessing) in which a physical memory is managed in common.

In the third embodiment, automatic scheduling of modules 131 to 136 can be performed.

In the third embodiment, an external device and external hardware part 136 can be easily applied to the memory device 3.

In the third embodiment, the processors $P_1$ to $P_N$ of the memory device 3 can be used efficiently, which enhances the performance of the memory device 3.

In the third embodiment, the second software developer can develop the modules 133 to 136, without considering scheduling of tasks.

In the third embodiment, when execution of a task is started, discontinuation does not occur until the execution of the task is completed. In the third embodiment, exchange of data or information does not occur between the processors $P_1$ and $P_2$ until execution of processing is completed. In the third embodiment, although the order of execution of tasks can be changed before execution of a task is started, the order of execution of tasks cannot be changed after the start of the execution of the task. In the third embodiment, execution of a task is not interrupted except for, for example, a case where an interrupt is received from the interrupt handler 137. Therefore, in the third embodiment, during task execution, switching of tasks can be suppressed to thereby enhance processing speed. Moreover, in the third embodiment, the total execution time of tasks does not change, but only the latency time of execution changes. Thus, latency times that occur in the memory device 3 can be stabilized.

In the third embodiment, dynamic allocation of the memory 7A is performed when the memory device 3 is started, and the allocation is not changed when tasks are switched. In the third embodiment, the common memory 7A is used for the exchange of data between related tasks, and memory protection is not carried out between the tasks. In the third embodiment, each task refers to a corresponding memory area. In the third embodiment, the number and frequency of occurrences of discontinuation of a task can be reduced. Therefore, a delay time due to switching of tasks can be reduced in the third embodiment.

In the third embodiment, common software can be used between a plurality of controllers 4, and hence it is easy to update the software and add functions to the memory device 3.

Fourth Embodiment

In the fourth embodiment, a specific structure example of the information processing system 1 and 1A explained in the first and second embodiments is explained.

FIG. 13 is a block diagram showing of an example of a detail structure of the information processing system according to the fourth embodiment.

An information processing system 1B includes the information processing device 2 and a memory system 3B.

The memory system 3B according to the fourth embodiment can executes the program $F_0$ to $F_M$ and the control program 11.

The memory device 3 according to the first to third embodiment correspond the memory system 3B.

The processors $P_0$ to $P_N$ of the memory device 3 correspond to a central processing units (CPUs) 43A and 43B.

The interface unit 6 corresponds to a host interface 41 and the host interface controller 42.

The memory units 7A and 7B correspond to a DRAM 47.

The address translation data 10 corresponds to an LUT 45.

The memory controller 9 corresponds to a NAND controller (NANDC) 50.

The information processing device 2 functions as a host device of the memory system 3B.

The controller 4 of the memory system 3B includes a front end 4F and a back end 4B.

The front end (host communication unit) 4F includes a host interface 41, host interface controller 42, encrypt/decrypt unit (Advanced Encryption Standard (AES)) 44, and CPU 43F.

The host interface 41 communicates requests (write command, read command, erase command), LBA, and data with the information processing device 2.

The host interface controller (control unit) 42 controls the communication of the host interface 41 in accordance with the control of the CPU 43F.

The encrypt/decrypt unit 44 encrypts write data (plaintext) transmitted from the host interface controller 42 in a data write operation. The encrypt/decrypt unit 44 decrypts encrypted read data transmitted from the read buffer RB of the back end 4B in a data read operation. Note that the transmission of write data and read data can be performed without using the encrypt/decrypt unit 44 as occasion demands.

The CPU 43F controls the above components 41, 42, and 44 of the front end 4F to control the whole function of the front end 4F.

The back end (memory communication unit) 4B includes a write buffer memory WB, read buffer memory RB, LUT 45, DDRC 46, DRAM 47, DMAC 48, ECC 49, randomizer RZ, NANDC 50, and CPU 43B.

The write buffer memory (write data transfer unit) WB stores write data transmitted from the information processing device 2 temporarily. Specifically, the write buffer WB temporarily stores data until the write data reaches to a predetermined data size suitable for the nonvolatile memory 5

The read buffer memory (read data transfer unit) RB stores read data read from the nonvolatile memory 5 temporarily. Specifically, read data is rearranged to be the order suitable for the information processing device 2 (the order of the logical address LBA designated by the information processing device 2) in the read buffer memory RB.

The LUT 45 is a table to translate a logical address LBA into a physical address PBA.

The DDRC 46 controls double data rate (DDR) in the DRAM 47.

The DRAM 47 is a nonvolatile memory which stores, for example, the LUT 45.

The direct memory access controller (DMAC) 48 transfers write data and read data through an internal bus IB. In FIG. 13, only a single DMAC 48 is shown; however, the controller 4 may include two or more DMACs 48. The DMAC 48 may be set in various positions inside the controller 4 as occasion demands.

The ECC 49 adds an error correction code (ECC) to write data transmitted from the write buffer memory WB. When read data is transmitted to the read buffer memory RB, the ECC 49, if necessary, corrects the read data read from the nonvolatile memory 5 using the added ECC.

The randomizer RZ (or scrambler) disperses write data in such a manner that write data are not biased in a certain page or in a word line direction of the nonvolatile memory 5 in a data write operation. By dispersing the write data in this manner, the number of writing can be equalized and the cell life of a memory cell MC of the nonvolatile memory 5 can be prolonged. Therefore, the reliability of the nonvolatile memory 5 can be improved. Furthermore, the randomizer RZ restores, in a data read operation, original data by executing the inverse process of the randomizing process of data writing.

The NANDC 50 uses a plurality of channels (four channels CH0 to CH3 are shown in the Figure) to access the nonvolatile memory 5 in parallel in order to satisfy a demand for certain speed.

The CPU 43B controls each component above (45 to 50, and RZ) of the back end 4B to control the whole operation of the back end 4B.

Note that a structure of the controller 4 is not limited to the structure shown in FIG. 13 which is an example only.

FIG. 14 is a perspective view showing an example of a storage system according to the fourth embodiment.

A storage system 100 includes the memory system 3 as an SSD.

The memory system 3 is, for example, a relatively small module. Note that the size and scale of the memory system 3B may be changed into various sizes arbitrarily.

Furthermore, the memory system 3B may be applicable to the information processing device 2 as a server used in a data center or a cloud computing system employed in a company (enterprise) or the like. Thus, the memory system 3B may be an enterprise SSD (eSSD).

The memory system 3B includes a plurality of connectors (for example, slots) 101 opening upwardly, for example.

A plurality of memory systems 3B are individually attached to the connectors 101 of the information processing device 2 and supported in such an arrangement that they stand in an approximately vertical direction. Using this structure, a plurality of memory systems 3B can be mounted collectively in a compact size, and the memory systems 3B can be miniaturized. Furthermore, the shape of each memory system 3B of the fourth embodiment is 2.5 inch small form factor (SFF). With this shape, the memory system 3B can be compatible with an enterprise HDD (eHDD) and an easy system compatibility with the eHDD can be achieved.

Note that the memory system 3B is not limited to the use in an enterprise. For example, the memory system 3B can be used as a memory medium of a consumer electronic device such as a notebook portable computer or a tablet terminal.

As can be understood from the above, the information processing system 1B and the storage system 100 having the structure described in the fourth embodiment can achieve a mass storage advantage with the same advantages of the first to third embodiment.

Fifth Embodiment

A fifth embodiment is directed to a modification or a specific example of the first to fourth embodiments.

In the fifth embodiment, a description will be given of the functionality of the software-defined SSD platform.

The software-defined SSD platform according to the fifth embodiment is an OS that can be used in, for example, a controller including a plurality of processors. The software-defined SSD platform realizes parallel processing.

The software-defined SSD platform is generated in accordance with, for example, a unified Flash Translation Layer (FTL) design. More specifically, the software-defined SSD platform includes a common interface layer, an FTL and a device driver, which are arranged in a descending order. The common interface layer provides a common interface for programs. The FTL, which is a layer just below the common interface layer, is used to perform overall management, such as allocation of an areas (such as a block) to a nonvolatile memory, address translation, wear leveling, and garbage collection. The wear leveling is, for example, processing for uniformly distributing rewriting of data to a nonvolatile semiconductor memory, to thereby increase the life of use of the memory.

Furthermore, the software-defined SSD platform performs allocation of a namespace, management of the size and the number of the namespace, and access control for the namespace.

The above-described management by the software-defined SSD platform is executed in accordance with management information.

The software-defined SSD platform includes an automatic performance tuning function, a dynamic load balancing function and a task scheduling function, and abstracts the hardware unit 4H.

FIG. 15 is a block diagram showing an example of a configuration of the software-defined platform according to the fifth embodiment.

A program F is arbitrary software, such as firmware, an application program, a module or a handler. Although in the embodiment, the program F is assumed to be, for example, SSD firmware, it is not limited to it.

The program F is divided into a plurality of modules as tasks in accordance with respective process contents. For example, the program F may be divided into a host interface control module Fa, a write control module Fb, a read control module Fc, or a module unit other than them. Further, the program F may include an FTL module and a wear leveling module.

The plurality of modules conform to Inter-task Communication API, in order to perform communication between tasks, and exchange data, information, signals, commands, messages, requests, instructions, etc.

The software-defined platform includes a dynamic task scheduler 15D, a Hardware Abstraction Layer (HAL) 301, a device driver 311, the hardware part 4H and the nonvolatile memory 5.

The dynamic task scheduler 15D controls the execution order of tasks. More specifically, the dynamic task scheduler 15D conforms to the HAL API, and exchanges data, information, signals, commands, messages, requests, instructions, etc., with modules and the HAL 301.

The HAL 301 abstracts the hardware part 4H. For instance, the HAL 301 is formed of software existing between the hardware part 4F and the device driver 311 of the memory device and the program F operating on the memory device. The HAL 301 hides a hardware-based difference existing between one hardware unit and another hardware unit from the program F and the dynamic task scheduler 15D. More specifically, the HAL 301 is a common module that realizes basic action between the dynamic task scheduler 15D and the hardware part 4H and between the dynamic task scheduler 15D and the device driver 311, and absorbs a difference in the hardware part 4H, so that the program F and the dynamic task scheduler 15D will be independent of the hardware part 4H and the device driver 311. For example, when a specification change arises in the hardware part 4H or the device driver 311, it is sufficient if only the HAL 301 is modified in accordance with the specification change. That is, the program F and the dynamic task scheduler 15D will not influenced by the specification change of the hardware part 4H or the device driver 311.

The device driver 311 is software for accessing the hardware part 4H. The device driver 311 may includes a plurality of device drivers. For instance, the device driver 311 includes a device driver 311a for a NAND flash memory, a device driver 311b for a peripheral device, a device driver 311c for a host device, or device drivers other than them. In addition, the device driver 311 may be implemented by hardware.

The hardware part 4H is hardware, and includes, for example, the device driver 311, a plurality of processors $P_1$ to $P_N$, and the memory 7A.

As described above, in the software-defined SSD platform, access to the nonvolatile memory 5 is performed hierarchically in accordance with the program F through the dynamic task scheduler 15D, the HAL 301, the device driver 311 and the hardware part 4H.

FIG. 16 is a view showing examples of two types of scheduling realized by the software-defined SSD platform according to the fifth embodiment. FIG. 16 shows an example of a case where the number of processors that can access the shared memory SM is four. However, it is sufficient if the number of processors that can access the shared memory SM is two or more. FIG. 16 shows an example of a case where the number of processors communicable via an interconnection network N is four. However, it is sufficient if the number of processors communicable via the interconnection network N is two or more.

The software-defined SSD platform includes a dynamic task scheduler 15D and a static task scheduler 15S.

The dynamic task scheduler 15D manages to which processor among the plurality of processors, a task should be allocated.

The static task scheduler 15S manages a sequence of execution of tasks allocated to respective processors.

The memories $M_0$ to $M_8$ correspond to the processors $P_0$ to $P_8$, respectively, and are accessed by the processors $P_0$ to $P_8$, respectively. The shared memory SM can be accessed by a plurality of processors $P_0$ to $P_3$. The interconnection network N is a network for transmitting and receiving data, information, signals, commands, messages, requests, instructions, etc., between a plurality of processors $P_5$ to $P_8$.

A shared memory platform is applied to the first architecture. In the first architecture, data, information, signals, commands, messages, requests and instructions, etc., are mutually exchanged between a plurality of processors $P_0$ to $P_3$ via the shared memory SM. The dynamic task scheduler 15D performs scheduling concerning which processor each task should be allocated to. The static task scheduler 15S determines, from the allocated tasks, a task to be subsequently executed in each of the processors $P_0$ to $P_3$.

In the shared memory platform, any of the processors $P_0$ to $P_3$ can access the shared memory SM. This enables the dynamic task scheduler 15D to adjust performance to keep constant loads of the processor $P_0$ to $P_3$, by detecting a processor of a low load and allocating a task to the detected processor.

The second architecture includes a single processor $P_4$ and a memory $M_4$ corresponding to the single processor $P_4$. The static task scheduler 15S determines a task to be subsequently executed by the processor $P_4$.

A distributed memory platform is applied to the third architecture. In the third architecture, a plurality of processors $P_5$ to $P_8$ mutually transmit and receive data, information, signals, commands, messages, requests, instructions, etc., via the interconnection network N. The static task scheduler 15S determines a task to be subsequently executed in each of the processors $P_5$ to $P_8$.

In the distributed memory platform, when each of the processors $P_5$ to $P_8$ executes a series of tasks (hereinafter, referred to as a task chain), if processors that execute respective tasks are predetermined in accordance with contents of the tasks, high-speed processing can be achieved. For example, when a large number of task chains for sequentially processing a read task, a host communication task and a write task are input, reading, host communication and writing are allocated to the processor $P_5$, the processor $P_6$ having a host communication interface, and the processor $P_7$, respectively.

However, in the distributed memory platform, communication between the processors $P_5$ to $P_8$ is needed. For instance, the processor $P_5$ having executed the read task transmits a result (including, for example, read data) of the read task to the processor $P_6$ for executing the host communication task. When a time required for communication between the processors $P_5$ to $P_8$ is not sufficiently short with respect to a time required for processing a task, if different processors are used for respective tasks, the processing may become low. In this case, the processing speed is increased by allocating a certain number of tasks to a particular processor. That is, tasks belonging to the same task chain are prevented from being shifted (for example daisy chain) among a plurality of processors by allocating a predetermined number of tasks to the same processor.

In the fifth embodiment, it is assumed that reading and writing are not simultaneously performed during execution of a task chain.

In the fifth embodiment, as a rule for generating a task, for example, a global variable, a static variable, a heap memory, or a function dynamically securing a memory, such as the Mallock function or a free function, is not used.

As a rule for generating a task, a queue in which an order of priority is set without using, for example, a spin lock is used.

As a rule for generating a task, for example, hardware is not directly controlled.

As a rule for generating a task, an automatic variable may be used, or a hardware accelerator may be used via the HAL 301. The hardware accelerator is assumed to be hardware added to, for example, accelerate processing of a computer.

In the fifth embodiment, the dynamic task scheduler 15D performs task switching of low latency, along with the static task schedulers 15S.

The task according to the fifth embodiment is executed in accordance with a priority order cooperatively set by each processor.

The dynamic task scheduler 15D uses, for example, a Lock-free algorithm. The Lock-free algorithm is an algorithm for enabling a plurality of tasks to be executed simultaneously, and to execute reading and writing without damaging target data, unlike an algorithm for locking and protecting shared data.

The dynamic task scheduler 15D performs Run-To-Completion scheduling, for example. The Run-To-Completion scheduling is a scheduling model in which a task is executed until the task is completed or until control is explicitly transferred to a scheduler.

As an inter-task communication, an inter-task communication of a message passing type is used, for example.

In the fifth embodiment, the master scheduler can portable tasks, and performs dynamic load sharing and automatic performance tuning. The subordinate scheduler reduces switch latency that occurs in task switching.

FIG. 17 is a view showing examples of parameters held in each layer of the memory device according to the fifth embodiment.

As described above, the program F hierarchically accesses the NAND flash memories $B_0$ to $B_P$ through the dynamic task scheduler 15D, the HAL 301, the device driver 311, and the hardware part 4H. Parameters held in each layer when accessing, are described by different forms even if the parameters have same contents. This enables parameters of appropriate degrees of abstraction to be held in the respective layers.

For example, FIG. 17 shows an example of description forms in respective layers associated with access latency allowed in accessing the nonvolatile memory 5. Since a time required for processing for data transmission and reception can be increased by allowing latency during access to the nonvolatile memory 5, errors that may occur during reading and writing can be reduced by, for example, elongating an error correction code.

A parameter P1701 shows access latency held in the program F. In the program F, access latency is expressed by 2-bit data, which defines four latency conditions (latency is unallowable, short latency is allowable, general latency is allowable, long latency delay is allowable). This access latency conditions may be defined by, for example, a standard.

A parameter P1702 shows access latency held in the HAL 301. In the HAL 301, access latency is expressed by, for example, 8-bit data. In this case, when the program F accesses the HAL 301, parameter conversion is performed. For example, "00" in the program F is 0 in the HAL 301, and "01" in the program F is one of 1 to 85 in the HAL 301. Similarly, "10" in the program F is one of 86 to 170 in the HAL 301, and "11" in the program F is one of 171 to 255 in the HAL 301. The parameter P1701 in the program F is converted into an appropriate value in the HAL 301 in accordance with, for example, a relationship of the parameter P1701 and another parameter.

A parameter P1703 shows access latency held in the hardware part 4H. In the hardware part 4H, access latency is defined using three parameters (i.e., whether direct look ahead (DLA) scheme is ON or OFF, iterated-decoding count, latency threshold). The DLA scheme is a method of compensating, in a read operation, for influence of a shift in threshold voltage due to interference between memory cells. The values the parameters can assume may be, for example, 1-bit data indicating ON or OFF in association with the DLA scheme, may be 1 to 5 in association with the iterated-decoding count, and may be 1 to 5 in association with the latency threshold). The hardware part 4H may hold some combinations of those values as parameter sets. The parameter P1702 in the HAL 301 is converted into a combination of suitable parameters or a parameter set number in accordance with, for example, a relationship of the parameter P1702 and another parameter, etc.

In addition, although, in the fifth embodiment, the parameter P1701 is associated with the program F, the parameter P1702 is associated with the HAL 301, and the parameter P1703 is associated with the hardware part 4H, the layers that hold the parameters may differ from them. For instance, the parameter P1702 may be held by the NAND controller or the device driver 311a of the NAND flash, and the parameter P1703 may be held by the NAND flash memories $B_0$ to $B_P$.

Referring now to FIGS. 18 to 21, an operation of a task scheduler will be described. FIGS. 18 to 21 are directed to an example case where execution commands for executing respective tasks are managed in various queues. However, managed targets of the various queues may be tasks themselves, instead of the execution commands.

Figure 18:
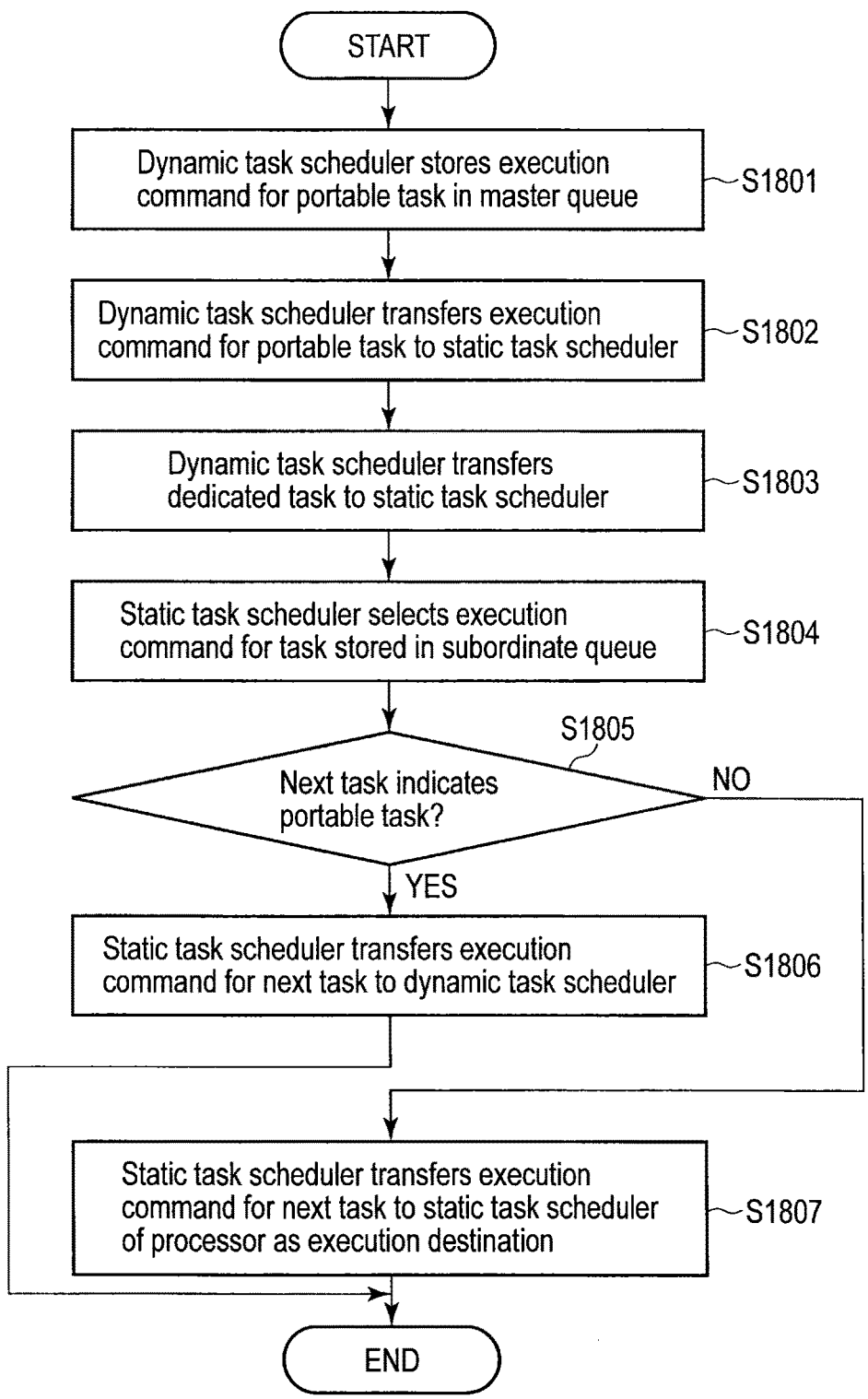
FIG. 18 is a flowchart showing an example of scheduling according to the fifth embodiment.

FIG. 18 is a flowchart showing an example of scheduling according to the fifth embodiment.

FIG. 19 is a view showing the first example of the scheduling according to the fifth embodiment, and shows an operation performed in S1801 in FIG. 18.

FIG. 20 is a view showing the second example of the scheduling according to the fifth embodiment, and shows an operation performed in S1802 of FIG. 18.

Figure 21:
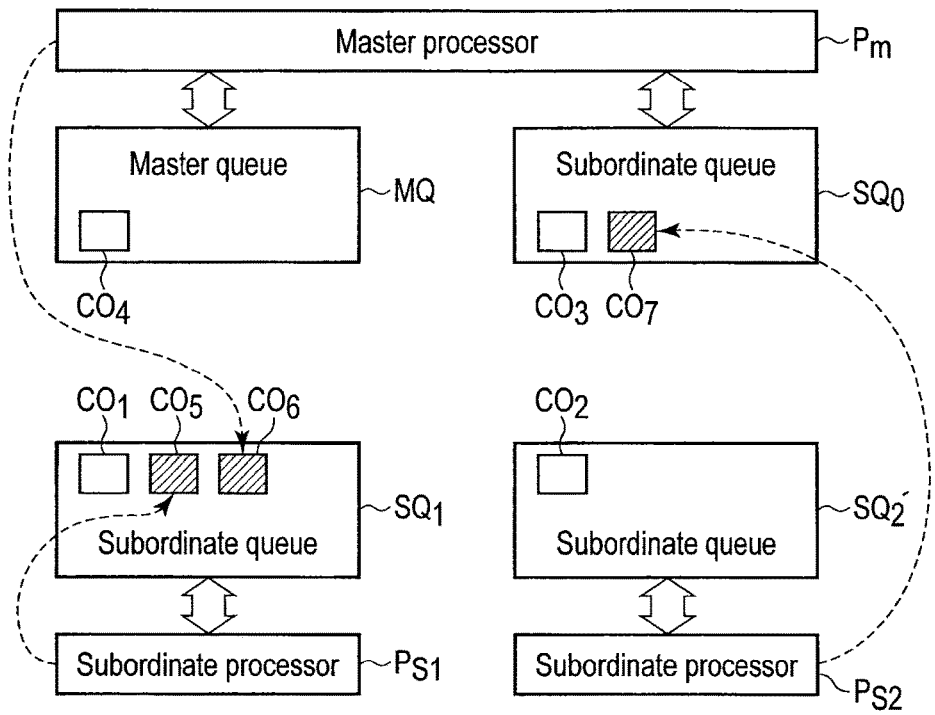
FIG. 21 is a view showing the third example of the scheduling according to the fifth embodiment.

FIG. 21 is a view showing the third example of the scheduling according to the fifth embodiment, and shows an operation performed in S1803 of FIG. 18.

The hardware part 4H includes a master processor Pm, and subordinate processors $P_{S1}$ and $P_{S2}$. The master processor Pm is associated with a master queue MQ and a subordinate queue $SQ_0$. The subordinate processors $P_{S1}$ and $P_{S2}$ are associated with subordinate queues $SQ_1$ and $SQ_2$, respectively.

The master queue MQ is managed by the dynamic task scheduler 15D.

The subordinate queues $SQ_0$, $SQ_1$ and $SQ_2$ are managed by the static task schedulers 15S.

The tasks include portable tasks and dedicated tasks. The portable tasks can be performed by the master processor Pm, and the subordinate processors $P_{S1}$ and $P_{S2}$. The dedicated tasks are tasks that each need to execute in a particular processor included in the master processor Pm and the subordinate processors $P_{S1}$ and $P_{S2}$.

In step S1801, the dynamic task scheduler 15D stores execution commands for portable tasks in the master queue MQ for load balancing between a plurality of processors.

In the example of FIG. 19, subordinate processors $P_{S1}$ and $P_{S2}$ store execution commands T1 to T4 for portable tasks in the master queue MQ, in accordance with the dynamic task scheduler 15D.

In step S1802, the dynamic task scheduler 15D transfers an execution command, selected from execution commands managed by the master queue MQ, to the static task scheduler 15S corresponding to a low-load processor, so that whole processing will finish within a predetermined time. The static task scheduler 15S stores the received execution command in the subordinate queue. More specifically, the dynamic task scheduler 15D monitors a state of each of the processors Pm, $P_{S1}$ and $P_{S2}$, and ports an execution command for a portable task to the subordinate queue of a lowest-load processor. Whether a processing load is high or low may be determined by the dynamic task scheduler 15D based on whether the number of execution commands for tasks accumulated in each of the subordinate queues $SQ_0$, $SQ_1$ and $SQ_2$ exceeds a predetermined number. If there is no low-load processor, the dynamic task scheduler 15D may not port an execution command for a task.

In the example of FIG. 20, the dynamic task scheduler 15D determines that the processing loads of the master processor Pm and the subordinate processors $P_{S1}$ and $P_{S2}$ are low, and ports execution command CO3, CO1 and CO2 for tasks, which are included in execution commands CO1 to CO4 held by the master queue MQ, to the subordinate queues $SQ_0$, $SQ_1$ and $SQ_2$, respectively.

In step S1803, the dynamic task scheduler 15D directly transfers an execution command for a dedicated task to the static task scheduler 15S of a processor corresponding to the dedicated task, and the static task scheduler 15S stores the received execution command in a subordinate queue.

In the example of FIG. 21, the master processor Pm and the subordinate processor $P_{S1}$ transfers, to the static task scheduler 15S, execution commands CO5 and CO6 for dedicated tasks of the subordinate processor $P_{S1}$ in accordance with the dynamic task scheduler 15D, and the static task scheduler 15S stores the execution commands CO5 and CO6 for the dedicated tasks in the subordinate queue $SQ_1$. Moreover, the subordinate processor $P_{S2}$ transfers an execution command CO7 for a dedicated task of the master processor Pm to the static task scheduler 15S in accordance with the dynamic task scheduler 15D, and the static task scheduler 15S stores the execution command CO7 for the dedicated task in the subordinate queue $SQ_0$.

In step S1804, the static task scheduler 15S manages the order of execution of an execution command for a portable or dedicated task stored in each subordinate queue, and selects a to-be-executed execution command in accordance with the first-in first-out method. That is, the static task scheduler 15S selects, as a processing target, an execution command existing at the head of a queue, and deletes the execution command as the processing target from the queue.

In step S1805, the static task scheduler 15S determines whether an execution command for a next task, which has occurred as a result of an execution, is an execution command for a portable task.

If the execution command for the next task is the execution command for the portable task, In step 1806, the static task scheduler 15S transfers the execution command for the next task to the dynamic task scheduler 15D, and the dynamic task scheduler 15D stores the received execution command in the master queue MQ.

In step S1807, if the execution command for the next task is the execution command for the dedicated task, the static task scheduler 15S transfers the execution command for the next task to the static task scheduler 15S of a processor as an execution destination, and this static task scheduler 15S stores the received execution command in a corresponding subordinate queue.

In addition, the order of steps S1803, S1801 and S1802 may be changed. Further, although FIGS. 19 to 21 are directed to an example case where the number of subordinate processors is two, the number of subordinate processors may be n (n is an arbitrary positive number). If there are no portable tasks, steps s1801 and S1802 may be omitted. If there are no dedicated tasks, step S1803 may be omitted.

FIG. 22 is a view showing an example of a task chain.

In FIG. 22, each queue Q may correspond to the master queue MQ or each of the subordinate queues $SQ_0$ to $SQ_n$, or may correspond to both the master queue MQ and each of the subordinate queues $SQ_0$ to $SQ_n$. In FIG. 22, after each task execution command is generated, each task execution command is managed in the queue Q until a corresponding task is executed.

The task chain is a chain of two or more tasks to be executed continuously, for example. The HAL 301h receives, for example, data, information, signals, commands, messages, requests, instructions, etc., from an outside, in accordance with the specific interface. For example, the HAL 301h issues an execution command based on an input/output command from the host device or the nonvolatile memory, or an external interrupt event such as a power supply event, a timer event, a NAND flash memory event, etc., and stores the execution command in a queue Q between the HAL 301h and the task T. More specifically, the external interruption event is, for example, a data transmission/reception command for the HAL 301h, a read command, a write command, or an erase command for the nonvolatile memory 5, a power control event, or a timer interruption event, etc. However, the external interruption event is not limited to the above.

After finishing a task chain, the HAL 301h sends data, information, a signal, a command, a message, a request, an instruction, etc., to the outside in accordance with the specific interface.

All task chains can be called by an interrupt handler. Each task prepares all information (parameters) necessary for a next task, before the next task is called.

After executing a task, the executed task may select a next task from a plurality of tasks. For example, if a task T has been normally finished, the task T may select a task chain TC1 as normal processing, and may store, in the queue Q, an execution command for a task Tn to be processed subsequently. In contrast, if the task T has been abnormally finished, the task T may select a task chain TC2 as exceptional processing, and may store, in the queue Q, an execution command for a task Te to be processed subsequently.

Moreover, when the task chain TC1 as normal processing and the task chain TC2 as exceptional processing are being executed in, for example, the subordinate processor $P_{S1}$, if the dynamic task scheduler 15D once transmits, to the master queue MQ, an execution command for a task included in a task chain, it requires a transmission/reception time, which inevitably delays processing. In view of this, if determining that a load of the subordinate processor $P_{S1}$ is low, the dynamic task scheduler 15D may transmit an execution command for a task to be processed subsequently, to the static task scheduler of the subordinate processor $P_{S1}$.

The HAL 301h as a hardware abstraction layer of a host device side does not access a device. Actual device access is performed by the device driver HAL 301d included in the task chain TC1 or the task chain TC2 wherein the task T is activated. Device access by the HAL 301d will be described later in detail with reference to FIGS. 25 to 28.

While being executed, the task T may call a task as a branch destination. More specifically, the task T may allocate, to a processor of low load, one or more tasks (for example, Tb1 and Tb2) that are included in the task chain TC1 as normal processing or in the task chain TC2 as exceptional processing, and can be processed in a parallel manner. In this case, the task T generates task chains TC3 and TC4 as branch processing. The branch processing may be branch processing with no access to the HAL 301d, such as the task chain TC3, or branch processing with access to the HAL 301d, such as the task chain TC4. The branch processing is, for example, log recording.

After executing a terminated task in the task chain, the HAL 301d acquires an execution command from the queue Q, executes the acquired execution command, and sends data, information, a signal, a command, a message, a request, an instruction, etc., to, for example, an outside.

FIG. 23 is a view showing an example of receiving/providing of information between tasks. The information, for example, received/provided between the tasks will hereinafter be referred to as an inter-task message.

In FIG. 23, a task Tp currently processed or already processed is associated with a work area WAp, a next task Tn selected when the task Tp has been normally finished is associated with a work area WAn, and an exceptional task Te selected when the task Tp has been abnormally finished is associated with a work area WAe. These tasks can write and read information to and from the corresponding work areas. The work area WAp, the work area WAn and the work area WAe are included in the memories $M_0$ to $M_8$ of FIG. 16.

The task Tp, the next task Tn and the exceptional task Te can store (write) and refer to (read) information in a shared work area CWA. The shared work area CWA is included in the shared memory SM shown in FIG. 16.

The work area WAp, the work area WAn, the work area WAe and the shared work area CWA may include plural types of memories (for example, an SRAM, a DRAM).

As described above, an execution command for a next task or an exceptional task, which is generated after the task Tp is executed, is managed using a queue Q. Similarly, an execution command generated after the next task Tn is executed is managed using a queue Q, and an execution command, which is generated after the exceptional task Te is executed, is managed using a queue Q. In FIG. 23, the queues Q existing between the task Tp and the next task Tn and between the task Tp and the exceptional task Te are omitted.

The task Tp may be able to refer to information in a work area corresponding to a task executed before the task Tp.

The task Tp may be able to store information in the work area WAn corresponding to the next task Tn executed after the task Tp, or in the work area WAe corresponding to the exceptional task Te.

The next task Tn and the exceptional task Te may be able to refer to information in the work area WAp corresponding to the task Tp executed before the next task Tn and the exceptional task Te are executed.

The next task Tn and the exceptional task Te may be able to store information in a work area corresponding to a task to be processed subsequently.

More specifically, inter-task messages are received/provided by first to third methods described below. Arrows in FIG. 23 indicate directions in which inter-task messages are moved.

The first method is a method of storing an inter-task message in the work area WAp of the task Tp, as indicated by an arrow S2301. In this case, a subsequently executed task (the next task Tn or the exceptional task Te) accesses the work area WAp, thereby referring to the inter-task message.

The second method is a method in which the task Tp stores an inter-task message in the work area of a subsequently executed task, as indicated by an arrow S2302. If the subsequently executed task is the next task Tn, the inter-task message is stored in the work area WAn, and the next task Tn refers to the inter-task message in the work area WAn. If the subsequently executed task is the exceptional task Te, the inter-task message is stored in the work area WAe, and the exceptional task Te refers to the inter-task message in the work area WAe.

The third method is a method in which tasks access an inter-task message in the shared work area CWA, as indicated by an arrow S2303. The task Tp stores the inter-task message in the shared work area CWA, and a subsequently executed task (the next task Tn or the exceptional task Te) refers to the inter-task message in the shared work area CWA.

Each task is called by a preceding task or an external handler. The preceding task prepares information (parameter) before calling a next task. Each task stores an inter-task message in at least a work area corresponding to a processor in which the task is executed or a work area of a next task.

Figure 24:
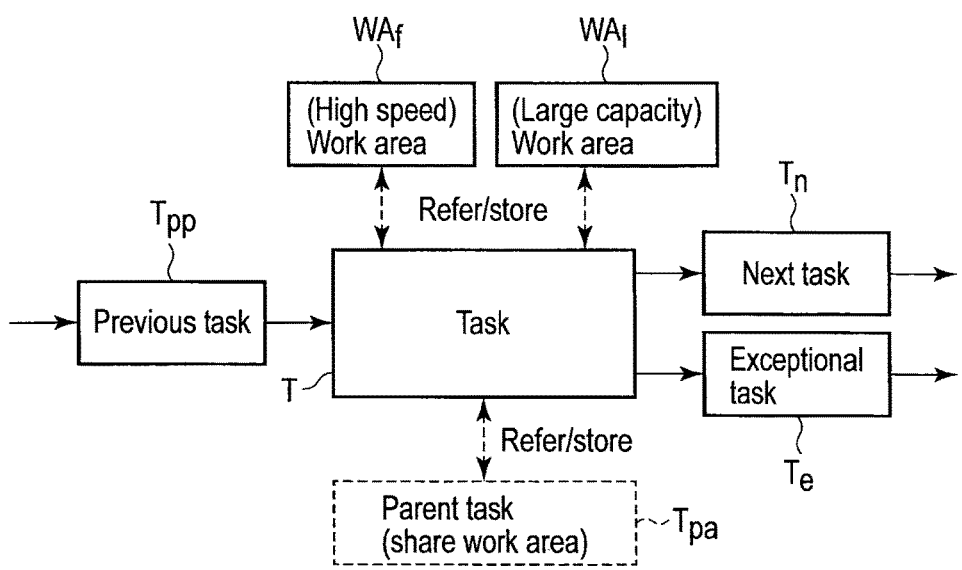
FIG. 24 is a view showing examples of work areas corresponding to tasks according to the fifth embodiment.

FIG. 24 is a view showing examples of work areas corresponding to tasks.

Work areas include a work area WAf that can be accessed at high speed, and a work area WA1 of a large storage capacity. Task control API defines the relationship between tasks, and exchanging of local work-area information. The task T is executed after a preceding task Tpp. After executing the task T, the next task Tn or the exceptional task Te is executed. The task T may access the work areas of other tasks. The task T refers to information in the shared work area CWA or stores information in the shared work area CWA.

Tasks may have hierarchy structure. A resource for a parent task and a resource for a child task may refer to each other. For example, a parent task Tpa for the task T exists, the task T may refer to task control structure of the parent task Tpa and a work area position in the task control structure.

The HAL API is used for host interface control, NAND control, power control, and timer control.

The host interface control notifies a host event, such as a command arrival, a data arrival, etc., to a scheduler.

The NAND control makes a queue including a read command, a write command, an erase command, etc., using their degrees of priority. The NAND control notifies a NAND event associated with a NAND flash memory to the scheduler.

The power control notifies a power supply event to the scheduler, and controls a power mode.

The timer control set or reset a parameter to a timer. The timer control notifies a timer event to the scheduler.

Figure 25:
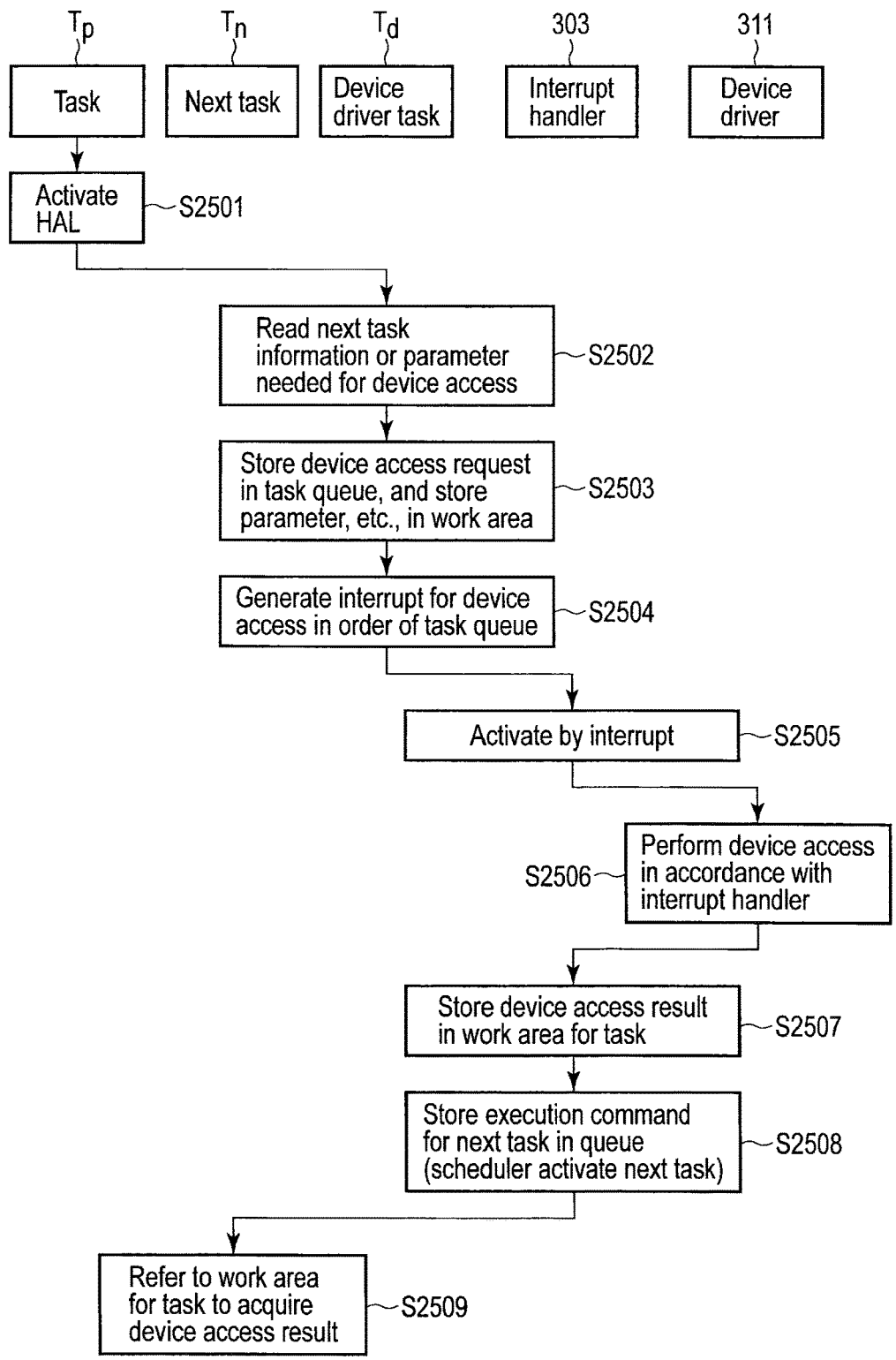
FIG. 25 is a flowchart showing an example of communication using a HAL according to the fifth embodiment.

Referring now to FIGS. 25 and 26, a description will be given of the inter-task communication using the HAL.

FIG. 25 is a flowchart showing an example of communication using the HAL according to the fifth embodiment.

FIG. 26 is a block diagram showing an example of the communication using the HAL according to the fifth embodiment.

The HAL 301d includes a device driver task Td and an interrupt handler 303. The HAL 301d also includes a device driver task queue DQ for managing processing order of the device driver task Td, and a work area WAh. FIG. 26 does not show a queue Q existing between the task Tp and the device driver task Td, a queue Q existing between the interrupt handler 303 and the next task Tn, and a queue Q existing between the interrupt handler 303 and the exceptional task Te. Further, the device driver task queue DQ and the work area WAh may be arranged in the same memory space. The work area WAh cannot be accessed by the other tasks.

In step S2501, the task Tp activates the HAL 301d. More specifically, the task Tp stores an execution command for the device driver task Td in the queue Q after the completion of processing of the task Tp, and the static task scheduler 15S or the dynamic task scheduler 15D activates the device driver task Td to be processed subsequently, in accordance with the execution command stored in the queue Q.

In step S2502, the device driver task Td acquires information of the next task Tn to be processed subsequently, and a parameter (parameters) required for device access. The device driver task Td may read the information of the next task Tn and the required parameter as an inter-task message from the work area WAp of the task Tp.

In step S2503, the device driver task Td issues a device access request. The device access request is stored in the device driver task queue DQ. Moreover, the device driver task Td stores, in the work area WAh, the inter-task message read in step S2502.

In step S2504, the device driver task Td acquires one device access request from the device driver task queue DQ, and generates an interruption for device access.

In step S2505, the interrupt handler 303 is activated by the interruption generated in step S2504.

In step S2506, within a sequence of processing of the interrupt handler 303 (in accordance with the interrupt handler 303), the device driver 311 performs device access to execute the requested processing.

In step S2507, the interrupt handler 303 may store, in the work area WAp of the task Tp, a device access result (return value) obtained from the device driver 311.

In step S2508, the interrupt handler 303 stores an execution command for the next task Tn or an execution command for the exceptional task Te in the queue Q in accordance with a processing result of the device driver task Td. The static task scheduler 15S or the dynamic task scheduler 15D activates the next task Tn or the exceptional task Te to be processed subsequently.

If a task subsequently executed is the next task Tn, the next task Tn refers to the work area WAp of the task Tp in step S2509, thereby acquiring the device access result (return value) stored in step S2507.

Also if the task subsequently executed is the exceptional task Te, the exceptional task Te similarly acquires the device access result (return value) from the work area WAp.

The HAL 301d may be called by a plurality of tasks. In this case, the HAL 301d may acquire, from the inter-task message stored in the work area WAh, identification information indicating from which one of the tasks a device access request has been issued. Further, the tasks can specify their respective next or exceptional tasks.

In the fifth embodiment, the HAL 301d stores the device access result as an inter-task message in the work area WAp for the task Tp, and a task to be processed subsequent to the task Tp refers to the work area WAp for the task Tp to obtain the inter-task message. This enables the task Tp and the next task executed subsequent to the task Tp to behave as if they perform direct inter-task communication, without consideration of the HAL 301d. That is, in inter-task communication, the HAL 301d can be hidden.

Figure 27:
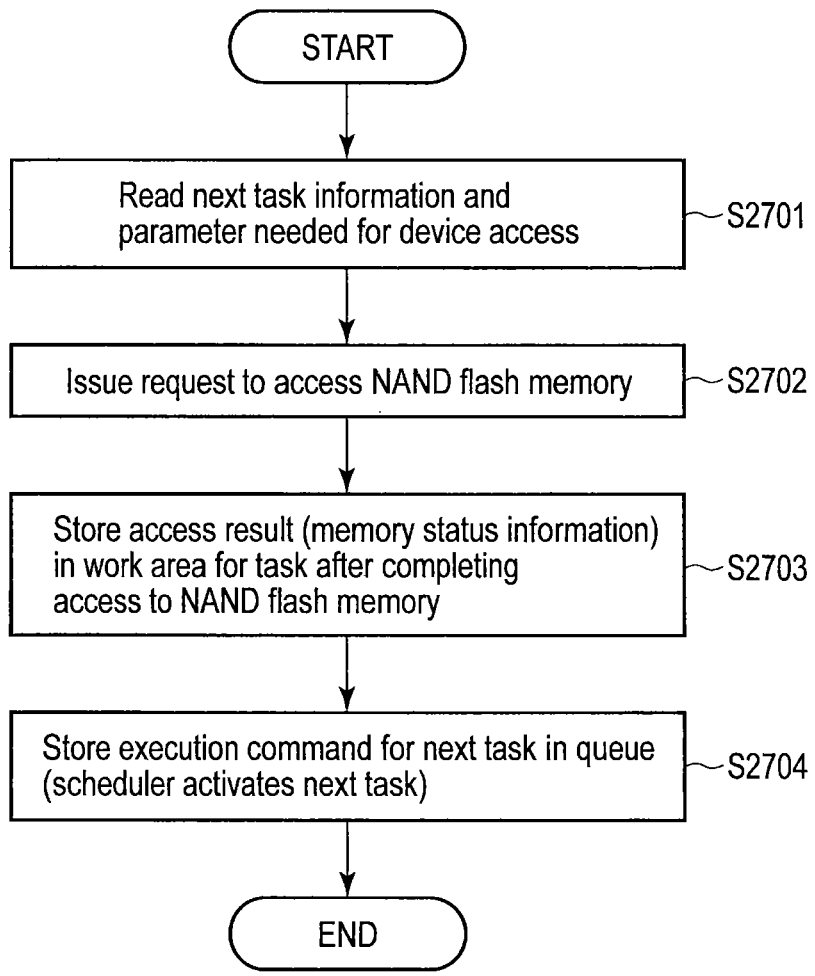
FIG. 27 is a flowchart showing an example of processing in conformity with a HAL API for a NAND flash driver according to the fifth embodiment.

FIG. 27 is a flowchart showing an example of processing conforming to the HAL API for a NAND flash driver.

FIG. 28 is a block diagram showing an example of the HAL API for the NAND flash driver.

In step S2701, the device driver task Td reads, as an inter-task message, identification information of the next task Tn to be processed subsequent to the task Tp and a NAND flash parameter required for device access from the work area WAp for the task Tp.

In step S2702, a NAND flash access request managed in a queue Q is issued to the NAND flash driver 311a. The device access request is stored in a device driver task queue DQ. The device driver task Td stores, in the work area WAh, the inter-task message read in step S2701.

Moreover, the NAND flash driver 311a accesses the NAND flash memories $B_0$ to $B_P$.

In step S2703, the device driver task Td stores a result of an access in the work area WAp for the task Tp, after completing the access to the NAND flash memories $B_0$ to $B_P$. The access result may be, for example, memory status information that indicates status of the NAND flash memories $B_0$ to $B_P$.

In step S2704, the device driver task Td stores, in a queue Q, an execution command for the next task Tn to be processed subsequently. The static task scheduler 15S or the dynamic task scheduler 15D activates the next task Tn in accordance with the execution command for the next task Tn.

In the fifth embodiment, the software-defined SSD platform executes host control. The host control, for example, supports commands, controls namespaces, and executes QoS (Quality of Service) control.

As the support of commands, the host control executes, for example, native command queuing (NCQ) for rearranging a plurality of commands in a most efficient order for reading and writing and executing the commands.

As the control of namespaces, the host control executes, for example, QoS control for each namespace. The QoS control includes, for example, differentiating in transfer processing in accordance with an attribute of traffic, and guaranteeing a band. For instance, the host control determines task chains corresponding to respective namespaces.

As the QoS control, acceptable latency information for a NAND flash controller, and priority control for task control, are managed in the host control.

Figure 29:
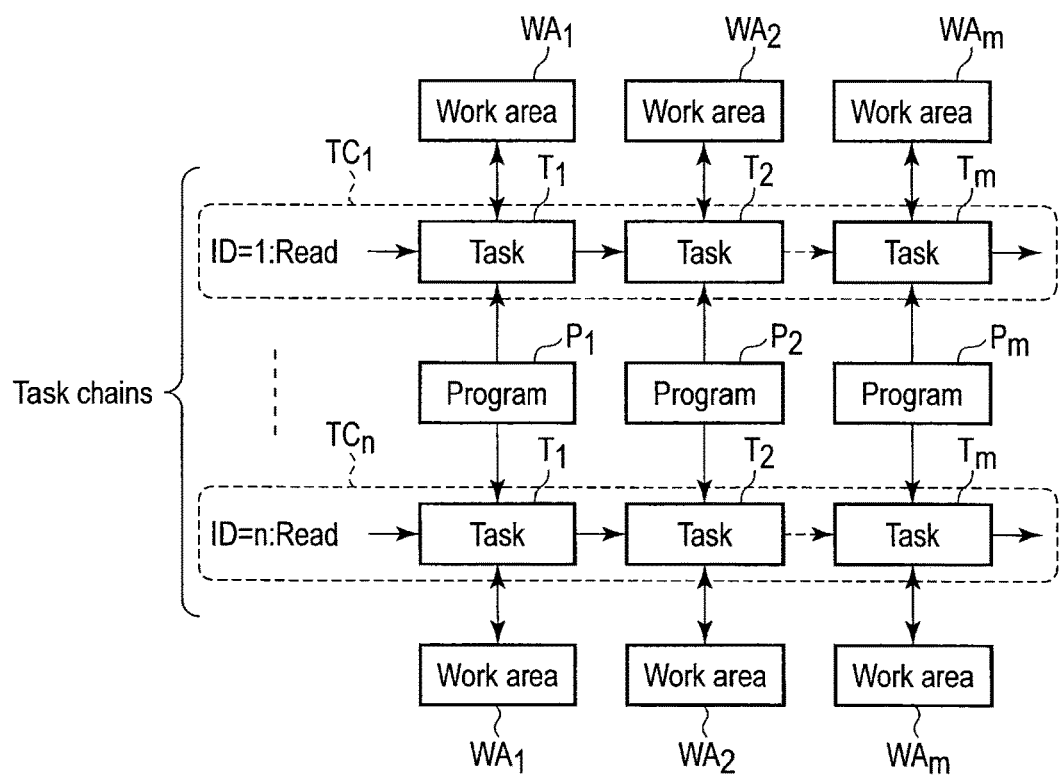
FIG. 29 is a block diagram showing an example of task allocation using NCQ according to the fifth embodiment.

FIG. 29 is a block diagram showing an example of task allocation using NCQ.

Task chains TC1 to TCn are discriminated by IDs assigned thereto. The task chains TC1 to TCn are processed independently of each other. Programs P1 to Pm for tasks may be shared amount the task chains TC1 to TCn. Work areas WA1 to WAm corresponding to tasks T1 to Tm included in each of the task chains TC1 to TCn are secured for each of the task chains TC1 to TCn independently.

Specifically, when, for example, the host device accesses the nonvolatile memory 5, the host device issues n read commands, whereby the task chains TC1 to TCn corresponding to the n read commands are executed. The task chains TC1 to TCn each include m tasks T1 to Tm. The host device or the memory device, for example, may allocate respective task chain IDs to the task chains TC1 to TCn.

Note that since all task chains TC1 to TCn correspond to read commands, the tasks T1 to Tm included in each of the task chains TC1 to TCn are common regardless of the task chain IDs. Because of this, the programs P1 to Pm for the tasks T1 to Tm are shared among the task chains TC1 to TCn, whereby resources managed by an entire system are reduced compared to a case where programs dependent of each other are allocated to respective task chains TC1 to TCn. More specifically, the tasks T1 in the respective task chains TC1 to TCn share the program P1, and the tasks Tm in the respective task chains TC1 to TCn share the program Pm.

As described above, the task chains TC1 to TCn share the program for processing the same task. Thus, the same tasks included in the different task chains TC1 to TCn are not simultaneously processed. For instance, the tasks T1 in the task chains TC1 to TCn processed by the program P1 are not simultaneously processed. Further, in each of the task chains TC1 to TCn, a plurality of commands are not simultaneously executed.

The same tasks included in the different task chains hold the different parameters respectively. Thus, the same tasks included in the different task chains secure different work areas. For example, the task T1 secures the work area WA1, and the task Tm secures the work area WAm. The parameter held by the task includes, for example, a procedure management parameter, a processing result of the task, etc. For example, the procedure management parameter designates a processing range (progress).

Although FIG. 29 shows a case where the task chains TC1 to TCn correspond to the same command, the task chains TC1 to TCn may correspond to different commands.

FIG. 30 is a block diagram showing an example of a function of the software defined SSD platform according to the fifth embodiment. FIG. 30 shows the relationship between function blocks which are obtained by dividing the software defined SSD platform of FIG. 15 into function blocks. In the description below, it is explained that the nonvolatile memory 5 accessed by the program F is a NAND flash memory. However, the nonvolatile memory 5 is not limited to the NAND flash memory.

The software-defined SSD platform includes, for example, a command control module 3101, a transmission/reception control module 3102, a write control module 3103, a read control module 3104, a write buffer 3105, a NAND write control module 3106, a read buffer 3107, a NAND read control module 3108, a look-up table 3109, a look-up table cash 3110, a NAND control module 3111 and a garbage collection control module 3112.

The command control module 3101 transmits and receives commands to and from the host device. When a command received from the host device is a write command, the command control module sends a write command to the write control module 3103. Further, when a command received from the host device is a read command, the command control module 3101 sends a read command to the read control module 3104.

Even if a command which is transmitted or received between the host device and the command control module 3101 and a command which is transmitted or received within the software-defined SSD platform have a same name, the forms of the commands may be difference respectively.

The transmission/reception control module 3102 transmits and receives data to and from the host device. The transmission/reception control module 3102 stores, in the write buffer 3105, data received from the host device. The transmission/reception control module 3102 receives data read from the NAND flash memory via the read buffer 3107, and transmits the data to the host device.

The write control module 3103 controls the write buffer 3105 and the NAND write control module 3106 in accordance with the write command from the command control module 3101. More specifically, the write control module 3103 sends, to the NAND write control module 3106, a command to write data, stored in the write buffer 3105, to the NAND flash memory.

The read control module 3104 controls the read buffer 3107 and the NAND read control module 3108 in accordance with the read command from the command control module 3101. More specifically, the read control module 3104 sends, to the NAND read control module 3108, a command to read data from the NAND flash memory and then store the data in the read buffer 3107.

The NAND write control module 3106 sends a write command to the NAND control module 3111. At this time, the NAND write control module 3106 may refer to the look-up table 3109, thereby sending a result of reference to the NAND control module 3111.

The NAND read control module 3108 stores the read data in the read buffer 3107.

The look-up table cash 3110 is a cash memory for accelerating access to the look-up table 3109, and stores at least the look-up table 3109. Further, the look-up table cash 3110 may be rewritten by the write control module 3103 via the write buffer 3105, and may be read by the read control module 3104 via the read buffer 3107.

The NAND control module 3111 writes and reads designated data to and from the NAND flash memory, in accordance with the write and read commands. The NAND control module 3111 sends read data to the NAND read control module 3108.

The garbage collection control module 3112 executes a garbage collection with controlling the write control module 3103 and the read control module 3104.

The write control module 3103 and the NAND write control module 3106 may not be separate. Similarly, the read control module 3104 and the NAND read control module 3108 may not be separate.

In the above-described embodiment, the hardware part 4H is hidden by the HAL 301. Further, the next task Tn to be processed subsequent to the task Tp acquires a result of access by the task Tp to the HAL 301 by referring to the work area WAp for the task Tp. That is, in inter-task communication, the hardware part 4H is hidden, which enhances the safety of communication. Furthermore, since the dynamic task scheduler 15D and the program F do not have to consider changes in the specifications of the hardware part 4H or the device driver 311, program codes can be easily maintained and managed.

The fifth embodiment adopts a shared memory platform. This enables the software-defined SSD platform to be adjusted by dynamic task scheduling so as to make performance of a plurality of processors have a constant load.

When holding the same parameter in different layers, the software-defined SSD platform according to the embodiment changes a content of the parameter between an upper-order layer (for example, the program F) and a lower-order layer (for example, the HAL 301, the device driver 311, or the hardware part 4H). This enables the respective layers to hold the parameter with appropriate degrees of abstraction.

In the fifth embodiment, a task chain may be branched to a task chain for normal processing and a task chain for exceptional processing in accordance with the processing result of the task T. This can omit complex branch processing (to determine whether normal processing or exceptional processing should be performed) performed in a task chain. As a result, the task T can be easily implemented by hardware.

In the fifth embodiment, the task T currently being processed allocates, to a processor of a low load, one or more parallel-processable tasks in the normal processing task chain TC1 or the exceptional processing task chain TC2. This enables a processing time of the entire software-defined SSD platform to be shortened.

The fifth embodiment provides, as the inter-task communication method, a method of storing an inter-task message in the work area WAp for the task Tp, a method of permitting the task Tp to store an inter-task message in the work area WAn for the next task Tn to be processed subsequently, and a method of enabling tasks to refer to an inter-task message using the shared work area CWA. This enables a developer to select an optimal inter-task communication method and implement the optimal inter-task communication.

In the fifth embodiment, tasks shared among a plurality of task chains generated in accordance with a plurality of commands from the host device are executed based on a shared program. This enables the resources managed by the entire system can be reduced, compared to a case where independent programs are held in respective task chains.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
a nonvolatile memory; and
a controller controlling the nonvolatile memory, wherein the controller comprises first to third processors,
the first processor is a master processor and manages execution destinations of new processing that is awaiting execution, is not currently assigned to be executed by any of the first to third processors, and is executable by any of the first to third processors, the first processor manages the execution destinations by determining the execution destination of the new processing managed by the first processor is the second processor if a number of execution-waiting processing to be executed by the second processor is not more than a first threshold, and determines the execution destination of the new processing managed by the first processor is the third processor if a number of execution-waiting processing to be executed by the third processor is not more than a second threshold, and
the controller determines, based on priority information including priority degrees associated with the new processing, at least one of the new processing that has an execution destination determined by the first processor to be executed next by one of the second and third processors.

2. A memory device comprising:
a nonvolatile memory; and
a controller controlling the nonvolatile memory, wherein the controller comprises first to third processors,
the first processor is a master processor and manages execution destinations of new processing that is awaiting execution, is not currently assigned to be executed by any of the first to third processors, and is executable by any of the first to third processors, the first processor manages the execution destinations by determining the execution destination of the new processing managed by the first processor is the second processor if a number of execution-waiting processing to be executed by the second processor is not more than a first threshold, and determines the execution destination of the new processing managed by the first processor is the third processor if a number of execution-waiting processing to be executed by the third processor is not more than a second threshold, and
the second processor determines, whether processing executed by the second processor has a dependence that next processing activated subsequent to the processing executed by the second processor is to be executed by the second processor, and, when the processing executed by the second processor has the dependence, the second processor determines that the next processing is to be executed by the second processor.

3. A memory device comprising:
a nonvolatile memory; and
a controller controlling the nonvolatile memory, wherein the controller comprises first to third processors,
the first processor is a master processor and manages execution destinations of new processing that is awaiting execution, is not currently assigned to be executed by any of the first to third processors, and is executable by any of the first to third processors, the first processor manages the execution destinations by determining the execution destination of the new processing managed by the first processor is the second processor if a number of execution-waiting processing to be executed by the second processor is not more than a first threshold, and the execution destination of the new processing managed by the first processor is the third processor if a number of execution-waiting processing to be executed by the third processor is not more than a second threshold, and the controller further comprises a shared memory shared among the first to third processor, and allocates, to processing before execution, a memory area in the shared memory used for the processing before execution.

4. The memory device of claim 1, further comprising a storage unit storing a program which controls the controller if the program is executed by the controller, wherein the first to third processors are controlled by the program, the controller comprises:

a first management module which corresponds to the first processor, and manages the new processing and execution order of the new processing;

a second management module which corresponds to the second processor, and manages the processing to be executed by the second processor and execution order of the processing to be executed by the second processor; and a third management module which corresponds to the third processor, and manages processing to be executed by the third processor and execution order of the processing to be executed by the third processor, if the number of processing managed by the second management module is not more than the first threshold, the program changes a management destination of the new processing managed by the first management module from the first management module to the second management module, if the number of processing managed by the third management module is not more than the second threshold, the program changes the management destination of the new processing managed by the first management module from the first management module to the third management module, and the program refers to the priority information, and determines the new processing whose management destination is changed from the first management module to one of the second and third management modules.

5. The memory device of claim 1, further comprising a storage unit storing a program which controls the controller if the program is executed by the controller, wherein the first to third processors are controlled by the program, the controller comprises:

a first management module which corresponds to the first processor, and manages the new processing and execution order of the new processing;

a second management module which corresponds to the second processor, and manages processing to be executed by the second processor and execution order of the processing to be executed by the second processor; and a third management module which corresponds to the third processor, and manages processing to be executed by the third processor and execution order of the processing to be executed by the third processor, if the number of processing managed by the second management module is not more than the first threshold, the program changes a management destination of the new processing managed by the first management module from the first management module to the second management module, if the number of processing managed by the third management module is not more than the second threshold, the program changes the management destination of the new processing managed by the first management module from the first management module to the third management module, the program refers to the priority information including priority degrees associated with new processing managed by the second management module, and determines processing executed subsequently among the processing managed by the second management module, and the program refers to the priority information including priority degrees associated with new processing managed by the third management module, and determines processing executed subsequently among the processing managed by the third management module.

6. The memory device of claim 2, further comprising a storage unit storing a program which controls the controller if the program is executed by the controller, wherein the first to third processors are controlled by the program, the controller comprises:

a first management module which corresponds to the first processor, and manages the new processing and execution order of the new processing;

a second management module which corresponds to the second processor, and manages processing to be executed by the second processor and execution order of the processing to be executed by the second processor; and a third management module which corresponds to the third processor, and manages processing to be executed by the third processor and execution order of the processing to be executed by the third processor, if the number of processing managed by the second management module is not more than the first threshold, the program changes a management destination of the new processing managed by the first management module from the first management module to the second management module, if the number of processing managed by the third management module is not more than the second threshold, the program changes the management destination of the new processing managed by the first management module from the first management module to the third management module, if the next processing is to be executed by the second processor, the program manages the next processing using the second management module, and if the next processing is executable by any one of the second and third processors, the program manages the next processing using the first management module.

7. The memory device of claim 2, further comprising a storage unit storing a program which controls the controller if the program is executed by the controller, wherein the first to third processors are controlled by the program, the controller comprises:

a first management module which corresponds to the first processor, and manages the new processing and execution order of the new processing;

a second management module which corresponds to the second processor, and manages processing to be executed by the second processor and execution order of the processing to be executed by the second processor; and a third management module which corresponds to the third processor, and manages processing to be executed by the third processor and execution order of the processing to be executed by the third processor, if the number of processing managed by the second management module is not more than the first threshold, the program changes a management destination of the new processing managed by the first management module from the first management module to the second management module, if the number of processing managed by the third management module is not more than the second threshold, the program changes the management destination of the new processing managed by the first management module from the first management module to the third management module, if the next processing is to be executed by the second processor, the program manages the next processing using the second management module, if the next processing is executable by any one of the second and third processors, and if the number of processing managed by the second management module is not more than the first threshold, the program manages the next processing using the second management module, if the next processing is executable by any one of the second and third processors, and if the number of processing managed by the third management module is not more than the second threshold, the program manages the next processing using the third management module, and if the number of processing managed by the second management module is more than the first threshold, and if the number of processing managed by the third management module is more than the second threshold, the program manages the next processing using the first management module.

8. The memory device of claim 3, further comprising a storage unit storing a program which controls the controller if the program is executed by the controller, wherein
the first to third processors are controlled by the program, the controller comprises:
a first management module which corresponds to the first processor, and manages the new processing and execution order of the new processing;
a second management module which corresponds to the second processor, and manages processing to be executed by the second processor and execution order of the processing to be executed by the second processor; and
a third management module which corresponds to the third processor, and manages processing to be executed by the third processor and execution order of the processing to be executed by the third processor,
if the number of processing managed by the second management module is not more than the first threshold, the program changes a management destination of the new processing managed by the first management module from the first management module to the second management module,
if the number of processing managed by the third management module is not more than the second threshold, the program changes the management destination of the new processing managed by the first management module from the first management module to the third management module.

9. The memory device of claim 3, further comprising a storage unit storing a program which controls the controller if the program is executed by the controller, wherein
the first to third processors are controlled by the program, the controller comprises:
a first management module which corresponds to the first processor, and manages the new processing and execution order of the new processing;
a second management module which corresponds to the second processor, and manages processing to be executed by the second processor and execution order of the processing to be executed by the second processor; and
a third management module which corresponds to the third processor, and manages processing to be executed by the third processor and execution order of the processing to be executed by the third processor,
if the number of processing managed by the second management module is not more than the first threshold, the program changes a management destination of the new processing managed by the first management module from the first management module to the second management module,
if the number of processing managed by the third management module is not more than the second threshold, the program changes the management destination of the new processing managed by the first management module from the first management module to the third management module, and
the program manages processing associated with hardware identification information indicating part of the controller, using a management module corresponding to the hardware identification information among the first to third management modules.

10. The memory device of claim 3, further comprising a storage unit storing a program which controls the controller if the program is executed by the controller, wherein
the first to third processors are controlled by the program, the controller comprises:
a first management module which corresponds to the first processor, and manages the new processing and execution order of the new processing;
a second management module which corresponds to the second processor, and manages the processing to be executed by the second processor and execution order of the processing to be executed by the second processor; and
a third management module which corresponds to the third processor, and manages the processing to be executed by the third processor and execution order of the processing to be executed by the third processor,
if the number of processing managed by the second management module is not more than the first threshold, the program changes a management destination of the new processing managed by the first management module from the first management module to the second management module,
if the number of processing managed by the third management module is not more than the second threshold, the program changes the management destination of the new processing managed by the first management module from the first management module to the third management module, first processing is executed by any one of the second and third processors, second processing is executed by any one of the second and third processors after execution of the first processing, and the first processing notifies the second processing of area information of at least part of the memory area in the shared memory, if the at least part of the memory area used for the first processing is used for the second processing.

11. The memory device of claim 3, further comprising a storage unit storing a program which controls the controller if the program is executed by the controller, wherein the first to third processors are controlled by the program, the controller comprises:

a first management module which corresponds to the first processor, and manages the new processing and execution order of the new processing;

a second management module which corresponds to the second processor, and manages the processing to be executed by the second processor and execution order of processing to be executed by the second processor; and a third management module which corresponds to the third processor, and manages processing to be executed by the third processor and execution order of the processing to be executed by the third processor, if the number of processing managed by the second management module is not more than the first threshold, the program changes a management destination of the new processing managed by the first management module from the first management module to the second management module, if the number of processing managed by the third management module is not more than the second threshold, the program changes the management destination of the new waiting processing managed by the first management module from the first management module to the third management module, first processing is executed by any one of the second and third processors, second processing is executed by any one of the second and third processors after execution of the first processing, third processing is executed by any one of the second and third processors after execution of the second processing, and the second processing receives, from the first processing, identification information indicating at least one of the first and third processing, reads information used for the second processing from a first memory area of the shared memory corresponding to the at least one of the first and third processing, and stores a result of execution of the second processing in a second memory area corresponding to the at least one of the first and third processing.

12. The memory device of claim 11, wherein the second processing reads information used for the second processing from a memory area corresponding to the first processing, and stores a result of execution of the second processing in a memory area corresponding to the third processing.

13. A memory device comprising:

a nonvolatile memory; and a controller controlling the nonvolatile memory, wherein the controller comprises first to third processors, the first processor is a master processor and manages execution destinations of new processing that is awaiting execution and is executable by any of the first to third processors, the first processor manages the execution destinations by determining, the execution destination of the new processing managed by the first processor is the second processor if the number of execution-waiting processing to be executed by the second processor is not more than a first threshold, and the execution destination of the new processing managed by the first processor is the third processor if the number of execution-waiting processing to be executed by the third processor is not more than a second threshold, the controller further comprises a shared memory shared among the first to third processor, and allocates, to processing before execution, a memory area in the shared memory used for the processing before execution, first processing is executed by any one of the second and third processors, second processing is executed by any one of the second and third processors after execution of the first processing, third processing is executed by any one of the second and third processors after execution of the second processing, and the second processing receives, from the first processing, identification information indicating at least one of the first and third processing, reads information used for the second processing from a first memory area of the shared memory corresponding to the at least one of the first and third processing, and stores a result of execution of the second processing in a second memory area corresponding to the at least one of the first and third processing.

14. The memory device of claim 13, wherein the second processing reads information used for the second processing from a memory area corresponding to the first processing, and stores a result of execution of the second processing in a memory area corresponding to the third processing.

* * * * *